United States Patent
Kizer et al.

(10) Patent No.: US 11,785,960 B2
(45) Date of Patent: *Oct. 17, 2023

(54) DAIRY PRODUCT ANALOGS AND PROCESSES FOR MAKING SAME

(71) Applicant: Ripple Foods, PBC, Berkeley, CA (US)

(72) Inventors: Lance Kizer, Berkeley, CA (US); Neil Renninger, Berkeley, CA (US); Michael Schelle, Berkeley, CA (US)

(73) Assignee: Ripple Foods, PBC, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,243

(22) Filed: Dec. 22, 2022

(65) Prior Publication Data

US 2023/0125846 A1    Apr. 27, 2023

Related U.S. Application Data

(63) Continuation of application No. 16/095,117, filed as application No. PCT/US2017/029167 on Apr. 24, 2017, now Pat. No. 11,571,002.
(Continued)

(51) Int. Cl.
*A23J 1/14*    (2006.01)
*A23C 11/10*    (2021.01)
(Continued)

(52) U.S. Cl.
CPC .............. *A23C 11/106* (2013.01); *A23J 1/14* (2013.01); *A23J 3/14* (2013.01); *A23J 3/34* (2013.01);
(Continued)

(58) Field of Classification Search
CPC ........ A23C 11/106; A23L 11/05; A23L 11/65; A23J 1/14; A23J 3/13; A23V 2002/00
(Continued)

(56) References Cited

U.S. PATENT DOCUMENTS 3,950,544 A    4/1976    Fridman
5,855,892 A    1/1999    Potter
(Continued)

FOREIGN PATENT DOCUMENTS

CN    1076588    9/1993
CN    102550669    7/2012
(Continued)

OTHER PUBLICATIONS

Mintel—NPL document describing a raspberry dessert comprising cultured pea protein. (Year: 2011).*
(Continued)

*Primary Examiner* — Hamid R Badr
(74) *Attorney, Agent, or Firm* — FisherBroyles, LLP; Adam K. Whiting; Adelaide K. Leitzel

(57) ABSTRACT

Provided are non-dairy yogurt analogs that have qualities similar to those of dairy-based yogurts. Certain embodiments are to plant-based yogurt analogs comprising fermented plant protein isolates and/or gelled plant protein isolates. Also provided are processes for production of such non-dairy yogurt analogs. For instance, a method for producing a plant-based yogurt mixture capable of being used to make a plant-based yogurt analog comprising the steps of: a) obtaining an essentially dairy-free base for a yogurt formulation that includes a plant-based derivative, such as a paste; and b) adding an acid to said formulation. Thereafter, the plant-based yogurt formulation may be used to manufacture a plant-based yogurt analog comprising the steps of: a) heating a plant-based yogurt mixture for a first predetermined amount of time while stirring; b) allowing the mixture to cool; c) adding yogurt cultures to the resultant mixture; and d) incubating the resultant mixture for a second pre-determined amount of time to produce a plant-based yogurt analog.

14 Claims, 7 Drawing Sheets

| INGREDIENT | SUPPLIER | PRODUCT | AMOUNT | UNITS | FINAL CONC. | STOCK CONC. |
|---|---|---|---|---|---|---|
| PROTEIN | Ripple | FA Paste | 148.3 | Grams | 52.5 g/L | 17.1% |
| WATER | EBMUD | Tap water | 296 | Grams | | NA |
| SUGAR | Florida Crystals | Organic Sugar Pure Cane | 32.5 | Grams | 65 g/L | NA |
| SUNFLOWER OIL | Spectrum Organic | High Heat Sunflower Oil | 5 | Grams | | |
| SUNFLOWER LECITHIN | Now | Sunflower Liquid Lecithin | 0.55 | Grams | | |
| RIBOFLAVIN | Spectrum | RI303 | 0.5 | Milliliters | 0.7 mg/L | 0.7 mg/ml |
| NIACIN | Spectrum | NI100 | 0.5 | Milliliters | 7 mg/L | 7 mg/ml |
| POTASSIUM PHOSPHATE MONOBASIC | Sigma | P5655 | 4 | Milliliters | 8 mM | 1 M |
| L-METHIONINE | Alfa Aesar | A10318 | 1.25 | Milliliters | 0.5 mM | 0.2 M |
| L-SERINE | Sigma | S4311 | 1.25 | Milliliters | 0.5 mM | 0.2 M |
| L-THREONINE | Sigma | T8441 | 1.25 | Milliliters | 0.5 mM | 0.2 M |
| YOGURT CULTURES | Belle+Bella | Non-dairy Yogurt Starter | 2.5 | Grams | | |

Related U.S. Application Data

(60) Provisional application No. 62/326,403, filed on Apr. 22, 2016.

(51) Int. Cl.

| | | |
|---|---|---|
| *A23J 3/14* | (2006.01) | |
| *A23L 29/206* | (2016.01) | |
| *A23J 3/34* | (2006.01) | |
| *A23L 11/65* | (2021.01) | |
| *A23L 11/00* | (2021.01) | |

(52) U.S. Cl.
CPC .............. *A23J 3/346* (2013.01); *A23L 11/05* (2016.08); *A23L 11/65* (2021.01); *A23L 29/206* (2016.08); *A23V 2002/00* (2013.01)

(58) Field of Classification Search
USPC .......................................................... 426/61
See application file for complete search history.

(56) References Cited

U.S. PATENT DOCUMENTS

| | | |
|---|---|---|
| 2001/0024666 A1 | 9/2001 | Waggle |
| 2004/0170744 A1* | 9/2004 | Akashe ................... A23L 33/19 426/634 |
| 2006/0127560 A1 | 6/2006 | Back |
| 2007/0207255 A1 | 9/2007 | Crank |
| 2008/0050497 A1 | 2/2008 | Mai |
| 2010/0062108 A1 | 3/2010 | Horiuchi |
| 2011/0250313 A1 | 10/2011 | Hwang |

FOREIGN PATENT DOCUMENTS

| | | |
|---|---|---|
| CN | 104982522 | 10/2015 |
| WO | 2003011040 | 2/2003 |
| WO | 2004034806 | 4/2004 |
| WO | 2014170716 | 10/2014 |

OTHER PUBLICATIONS

Bioferme Yosa Sport Pineapple-Orange Oat Dessert [Retrieved from Mintel on the 22nd of Dec. 2020] < URL: http://www.gnpd.com/sinatra/recordpage/2229654/?utm_source=download&utm_medium=rtf > Mintel record ID 2229654 published Nov. 2013.

Cha, Seong-Kwan et al., "Comparison of Cultivars of Soybean by Soy Yoghurt Production", Korean journal of food science and technology (F)Journal of Korea Assocation Food Society, vol. 22, No. 3, pp. 357-362, Jun. 30, 1990 , XP053022604.

Drake, et al., "Soy Protein Fortification Affects Sensory, Chemical, and Microbiological Properties of Dairy Yogurts", JFS: Sensory and Nutritive Qualities of Food, vol. 65, No. 7, 2000, pp. 1244-1247, XP002234095.

Fermentiq, "Using Mushrooms to Unlock the Full Potential of Plant-Based Proteins", MYCO Technology, Inc.; 2022.

International Search Report dated Jun. 20, 2017 for PCT/US2017/029167.

Kanda et al., "Yoghurt Production by Lactobacillus Fermentation of Soybean Milk", Process biochemistry, 11(4):3941 (1976).

Lestiyani, A. D. et al. J. Food. Nutr. Disor. 3:2 (Year: 2014).

Liu, Yutian, et al., "New Processes and New Formulations of Protein Food", Shandong science and technology press, Jun. 30, 2022, pp. 130 & 145.

Mession, et al., "Effect of Globular Pea Proteins Fractionation on Their Heat-Induced Aggregation and Acid Cold-Set elation", Food Hydrocolloids, vol. 46, Dec. 15, 2014 (Dec. 15, 2014 ), pp. 233-243, XP055641650, L ISSN: 0268-005X, DOI: 10.1016/j.foodhyd-2014.11.025.

Proliferation of Lactic Acid Bacteria Supplemented with Protein Hydrolysates and High-Cell-Density Culture System in Milk, Fengling BAI, Chinese Doctoral Dissertations & Master's Theses Full-text Database (Doctor), Engineering Science and Technology I, No. 9, p. 5.

Raspberry Dessert—Product Specification (Year: 2011).

Soetrisno, U., et al., Protein Yields and Characteristics from Acid and Salt Coagulations of Yellow Pea (*Pisum sativum* L. *Miranda*) Flour Extractions. J. Agric. Food Chem, 1992, 40, 970-974.

The Redwood Co. Wot No Dairy? Raspberry dessert [Retrieved from Mintel on 22nd of Dec. 2020] < URL: http://www.gnpd.com/sinatra/recordpage/1553623/?utm_source=download&utm_medium=rtf > Mintel record ID 1553623 published May 2011.

Zare, F. et al. Food Sci. Technol. 45: 155-160 (Year: 2012).

Mintel, Black Cherry Dairy & Soy Free Greek-Style Yogurt, http://www.gnpd.com, Mar. 2016, 5 pages.

* cited by examiner

| INGREDIENT | SUPPLIER | PRODUCT | AMOUNT | UNITS | FINAL CONC. | STOCK CONC. |
|---|---|---|---|---|---|---|
| PROTEIN | Ripple | FA Paste | 148.3 | Grams | 52.5 g/L | 17.1% |
| WATER | EBMUD | Tap water | 296 | Grams | | NA |
| SUGAR | Florida Crystals | Organic Sugar Pure Cane | 32.5 | Grams | 65 g/L | NA |
| SUNFLOWER OIL | Spectrum Organic | High Heat Sunflower Oil | 5 | Grams | | |
| SUNFLOWER LECITHIN | Now | Sunflower Liquid Lecithin | 0.55 | Grams | | |
| RIBOFLAVIN | Spectrum | R1103 | 0.5 | Milliliters | 0.7 mg/L | 0.7 mg/ml |
| NIACIN | Spectrum | N1100 | 0.5 | Milliliters | 7 mg/L | 7 mg/ml |
| POTASSIUM PHOSPHATE MONOBASIC | Sigma | P5655 | 4 | Milliliters | 8 mM | 1 M |
| L-METHIONINE | Alfa Aesar | A10318 | 1.25 | Milliliters | 0.5 mM | 0.2 M |
| L-SERINE | Sigma | S4311 | 1.25 | Milliliters | 0.5 mM | 0.2 M |
| L-THREONINE | Sigma | T8441 | 1.25 | Milliliters | 0.5 mM | 0.2 M |
| YOGURT CULTURES | Belle+Bella | Non-dairy Yogurt Starter | 2.5 | Grams | | |

FIGURE 1

DAIRY PRODUCT ANALOGS AND PROCESSES FOR MAKING SAME

CROSS REFERENCE TO RELATED APPLICATIONS

This application is a continuation application of U.S. application Ser. No. 16/095,117 filed Oct. 19, 2018 which is the National Phase application of International Application No. PCT/US2017/029167, filed Apr. 24, 2017 which designates the United States and was published in English, which claims the benefit of U.S. Provisional Application No. 62/326,403, filed Apr. 22, 2016. These applications, in their entirety are incorporated herein by reference in its entirety. This application is also related to U.S. Provisional Application Ser. No. 62/276,030, filed Jan. 1, 2016, and entitled Dairy Product Analogs and Processes for Making Same, which is incorporated herein by reference in its entirety.

FIELD OF THE DISCLOSURE

The present disclosure relates to yogurt analogs that are derived substantially from or wholly from non-animal sources, but that have color, flavor, nutritional content, mouth-feel, texture and/or other qualities that are similar to those of dairy products. Also provided are processes for production of such yogurt analogs.

BACKGROUND

Vegetarian and vegan diets provide many benefits to consumers. Such benefits include healthy nutrition (e.g., lower saturated fats, no cholesterol), absence of ethical or religious dietary conflicts, less negative environmental impacts (e.g., less green house gases produced in production), more efficient use of resources (e.g., less water used in production), and for consumers who have developed intolerances to certain dairy milk constituents, avoidance of such intolerance.

Dairy-like food products derived from soybean, coconut, and almond are available to consumers. Demand for these vegetarian/vegan alternatives to dairy products is fueled, inter alia, by the factors described above. However, acceptance of the dairy substitutes has been relatively low. In addition, the appearance, flavor and/or mouth feel of the currently available dairy substitutes has not appealed to consumers. Moreover, many of the currently available dairy substitutes have lower nutritional value than their dairy analogs.

Production of dairy substitutes from other natural sources is therefore desirable. However, many natural sources comprise compounds that limit their application in food products. For instance, many plants contain compounds that produce distinct colors and/or flavors that are unpleasant and difficult to mask with coloring and/or flavoring agents. The compounds may also affect the structure or stability of proteins, and consequently affect the appearance, sensory and nutritional qualities, and shelf lives of food products derived from such other natural sources.

It is particularly challenging to create a plant-based yogurt formulation that results in a texture and taste similar to dairy yogurt without using any, or only using little dairy ingredients.

Commercial plant-based yogurts, such as So Delicious Almond Milk Plain Greek Yogurt, Wildwood Organic Plain Unsweetened Soyogurt, and Nancy's Organic Blackberry Cultured Soy have not met customer's needs. Many have proven too expensive or have been deemed unpalatable either based on taste, texture, color, and nutritional content.

Therefore, there exists an unmet need for dairy-free or substantially dairy-free yogurt formulations and/or plant-based yogurt that have the color, taste, nutritional content, and/or other qualities of dairy products, that do not challenge common nutritional sensitivities, and/or that provide consumption experiences consumers are accustomed to from dairy products. The present disclosure describes exemplary embodiments of formulations and/or plant-based yogurt that may meet various combinations of one or more of these features, as well as processes for their production. The present disclosure is directed to solving these and other problems disclosed herein. The present disclosure is also directed to overcoming and/or ameliorating at least one of the disadvantages of the prior art as will become apparent from the discussion herein. The present disclosure is also directed to pointing out one or more advantages to using yogurt analogs that are derived substantially from or wholly from non-animal sources, but that have color, flavor, nutritional content, texture and/or other qualities that are similar, or substantially similar, to those of dairy-based yogurts.

SUMMARY

It is believed that one reason non-dairy yogurts result in poor taste is that yogurt bases formulated from plant proteins and fats, instead of dairy milk, may not ferment to sufficient completion. The yogurt cultures stall (do not grow as well) and end up producing lower levels of organic acids. In exemplary embodiments, addition of various combinations of one or more acids, vitamins, complex amino acid mixtures (e.g. yeast, yeast extract, hydrolyzed soy protein, hydrolyzed pea protein, corn steep liquor, meat extract, peptone, casein hydrolysate, lactalbumin hydrolysate, soytone, tryptone) and minerals allowed the yogurt bacterial cultures to grow nearly as well as they do in a dairy culture, thus producing similar levels of organic acids resulting in a product that tastes more like a dairy yogurt fermentation.

Some embodiments are directed to non-dairy yogurt analogs that have qualities similar to those of dairy-based yogurts. Also provided are processes for production of such non-dairy yogurt analogs.

Certain embodiments are directed to a plant-based yogurt analog comprising: a) at least one of between 1% to 10% by weight of a plant protein, and between 1% to 90% by weight of a plant protein isolate. Certain embodiments are directed to a plant-based yogurt analog, wherein the plant protein isolate is a fermented plant protein isolate. Certain embodiments are directed to a plant-based yogurt analog, wherein the plant protein isolate is a gelled plant protein isolate. Certain embodiments are directed to a plant-based yogurt analog, wherein the plant protein isolate is a gelled plant protein isolate and/or a fermented plant protein isolate. Certain embodiments are directed to a plant-based yogurt analog, wherein the percentage of protein in the plant-based yogurt analog is between 1% and 10% by weight and the percentage of lactic acid in the plant-based yogurt is at least between 0.25% and 1.15% by weight. Certain embodiments are directed to a plant-based yogurt analog, wherein the percentage of protein in the plant-based yogurt analog is between 3.9% and 4.1% by weight and the percentage of lactic acid in the plant-based yogurt is greater than or equal to 0.55% by weight. Certain embodiments are directed to a plant-based yogurt analog, wherein the percentage of protein in the plant-based yogurt analog is between 7.9% and 8.1% by weight and the percentage of lactic acid in the plant-based yogurt is greater than or equal to 0.95% by weight. Certain embodiments are directed to a cultured plant-base analog.

Certain embodiments are directed to methods of producing a non-dairy yogurt formulation comprising the steps of: a) forming a mixture of plant-based milk; and b) one or more of the following emulsifier, complex amino acids mixture, buffer, niacin, riboflavin, yeast extract, l-methionine, l-serine, l-threonine, in a sufficient quantity such that the pH of the resulting mixture is below 4.5 or 5 once the mixture is (1) heated at about 185° F.; (2) the resultant mixture is covered and allowed to cool at about 105° F.; (3) yogurt cultures are added to the mixture; and (4) the resultant mixture is incubated at about 108° F.

Some embodiments are directed to methods for producing a plant-based yogurt mixture capable of being used to make a plant-based yogurt analog comprising the steps of: a) obtaining an essentially dairy-free base for a yogurt formulation that includes a plant-based derivative, such as a paste and/or protein isolate; and b) adding an acid to said formulation. Thereafter, the plant-based yogurt formulation may be used to manufacture a plant-based yogurt analog comprising the method steps of: a) heating a plant-based yogurt mixture for a first pre-determined amount of time; b) allowing the mixture to cool; c) adding yogurt cultures to the resultant mixture; and d) incubating the resultant mixture for a second pre-determined amount of time to produce a plant-based yogurt analog. In certain embodiments, the acid may be one or more amino acids. In some embodiments, the base is dairy-free. Some embodiments are directed to methods for producing a plant-based yogurt mixture capable of being used to make a plant-based yogurt analog wherein the base may contain dairy-derived ingredients by weight of no more than about 15%, in some embodiments it may be no more than about 10%, in some embodiments it may be no more than about 5% and in some embodiments it may be no more than about 1% of the total weight of the base.

Some embodiments provide for a method for producing a plant-based yogurt formulation capable of being used to make a plant-based yogurt analog comprising the steps of: a) obtaining an essentially dairy-free base for a yogurt formulation that includes a plant-based derivative, such as a paste and/or protein isolate; and b) adding an acid to said formulation. In some embodiments, the base is dairy-free. In some embodiments, the plant-based yogurt formulation may contain no more than about 1%, 5% or 10% by weight of dairy-derived ingredients. In certain embodiments, the acid may be one or more amino acids.

In some embodiments, the acid may be an amino acid. In some embodiments, the amino acid may be selected from the group of l-methionine, l-serine, l-threonine, and mixtures thereof. In some embodiments, the amount of acid added may be at least about 0.001% by weight of the amount of plant-based derivative. In some embodiments the amount of acid added may be between about 0.001 and 0.1% by weight of the plant-based derivative. In some embodiments, the total amount of acid added may be about 0.003%, 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, or 0.1% by weight of the plant-based derivative.

In some embodiments, the amount of acid added may be sufficient to obtain about 0.5 mM concentration of the acid in the plant-based yogurt formulation. In some embodiments, the amount of acid added may be sufficient to obtain between 0.2 mM to 0.8 mM, 0.3 mM to 0.65 mM, 0.4 mM to 0.6 mM, 0.45 mM to 0.55 mM or 0.48 mM to 0.52 mM concentration of the acid in the plant-based yogurt formulation. In some embodiments, the amount of acid added may be sufficient to obtain about 0.2 mM, 0.3 mM, 0.4 mM, 0.42 mM, 0.46 mM, 0.48 mM, 0.52 mM, 0.54 mM, 0.56 mM, or 0.58 mM concentration of the acid in the plant-based yogurt formulation.

Some embodiments provide for a method of producing a non-dairy yogurt formulation comprising the steps of: a) blending one or more plants to form a mixture; b) adding an oil to the mixture; c) adding a sugar to the mixture; and d) adding an additive to the mixture selected from the group of: lecithin; amino acids; potassium phosphate; niacin; riboflavin; yeast extract; yeast; or some combination thereof in a sufficient quantity such that the pH of the resulting mixture is below 5 once the mixture is cultured using a yogurt culturing procedure. In some embodiments, the method of culturing the mixture into a yogurt-like product may comprise the steps of: a) heating the mixture at 185° F. for about 30 seconds while stirring; b) covering the resultant mixture and allowing it to cool at 105° F.; c) adding yogurt cultures to the resultant mixture; and d) incubating the resultant mixture at about 108° F. for about 24 hours. In some embodiments, the stirring may be constant or substantially constant. In some embodiments, the non-dairy yogurt formulation is substantially dairy-free.

In some embodiments, the method of culturing the mixture into a yogurt-like product may comprise the steps of: a) heating the mixture for a first pre-determined amount of time while stirring; b) allowing the mixture to cool; c) adding yogurt cultures to the resultant mixture; and d) incubating the resultant mixture for a second pre-determined amount of time. In some embodiments, the stirring may be constant or substantially constant. The amount time that the mixture is heated during the first pre-determined is based at least in part on the kill kinetics for spore forming microbes and the temperature and time used may be varied. In certain embodiments, the heat treatment may be extended to further denature the protein and achieve a thicker texture. In some embodiments, the mixture may be heated for the first pre-determined amount of time of between 4 minutes and 6 minutes, between 4.5 minutes and 5.5 minutes, between 5 minutes and 15 minutes or 5 minutes at a temperature of about 165° F., between 160° F. and 170° F., between 162° F. and 168° F., between 165° F. and 170° F. or between 164° F. and 166° F. In some embodiments, the mixture may be heated for the first pre-determined amount of time of about 5 minutes at a temperature of about 165° F. In some embodiments, the mixture may be heated for a first pre-determined amount of time of between 0.3 minutes and 1 minute, between 0.4 minutes and 0.8 minutes, between 0.5 minutes and 2 minutes or 0.5 minutes at a temperature of about 185° F., between 175° F. and 190° F., between 182° F. and 187° F., between 185° F. and 190° F. or between 180° F. and 185° F. In some embodiments, the mixture may be heated for the first pre-determined amount of time of about 0.5 minutes at a temperature of about 185° F. In some embodiments, the mixture may be heated for the first pre-determined amount of time of between 0.03 minutes and 1 minute, between 0.04 minutes and 0.08 minutes, between 0.05 minutes and 0.2 minutes or 0.05 minutes at a temperature of about 210° F., between 195° F. and 220° F., between 200° F. and 215° F., between 205° F. and 215° F. or between 208° F. and 212° F. In some embodiments, the mixture may be heated for the first pre-determined amount of time of about 0.05 minutes at a temperature of about 210° F. Other variations or combinations in the temperature and time period for the first pre-determined amount of time are contemplated. In some embodiments, incubation of the resultant mixture for a second pre-determined amount of time of between 5 hours and 35 hours, between 6 hours and 8 hours, between 20 hours and 26 hours, between 6 hours and 10 hours may be carried out at a temperature of about 108° F., between 90° F. and 120° F., between 95° F. and 115° F., between 100° F. and 110° F., between 105° F. and 115° F. or between 95° F. and 105° F. In some embodiments, incubating the resultant mixture at about 108° F. for about 24 hours. In some embodiments, incubation of the resultant mixture for a second pre-determined amount of time of between 22 hours and 26 hours may be carried out at a temperature of between 105° F. and 110° F. In some embodiments, incubation of the resultant mixture for a second pre-determined amount of time of between 6 hours and 8 hours may be carried out at a temperature of between 110° F. and 115° F. In some embodiments the amount of acid added may be sufficient to obtain about 0.5 mM concentration of the acid in the plant-based yogurt formulation. In some embodiments, the amount of acid added may be sufficient to obtain between 0.2 mM to 0.8 mM, 0.3 mM to 0.65 mM, 0.4 mM to 0.6 mM, 0.45 mM to 0.55 mM or 0.48 mM to 0.52 mM concentration of the acid in the plant-based yogurt formulation. In some embodiments, the amount of acid added may be sufficient to obtain about 0.2 mM, 0.3 mM, 0.4 mM, 0.42 mM, 0.46 mM, 0.48 mM, 0.52 mM, 0.54 mM, 0.56 mM, or 0.58 mM concentration of the acid in the plant-based yogurt formulation.

In some embodiments, the desired pH of the yogurt-like product is below 4.5. In some embodiments, the plant, from which the plant-based derivative is obtained, is a high-starch plant. In some embodiments, the high-starch plant is pea. In some embodiments, the oil is sunflower oil. In some embodiments, the additive is lecithin. In some embodiments, the additive is selected from the group consisting of l-methionine, l-serine, l-threonine, or mixtures thereof.

Some embodiments provide an essentially dairy-free formulation comprising: a) between about 20-50% of a plant-based derivative; and b) an additive selected from the group consisting of: lecithin; amino acids; potassium phosphate; niacin; riboflavin; yeast extract; yeast; or some combination thereof in a sufficient quantity such that the pH of the resulting mixture is below 5 once the mixture is cultured using a yogurt culturing procedure. In some embodiments, the formulation and/or plant-based yogurt is dairy-free.

In some embodiments, the amount of dairy-derived ingredients by weight may be no more than about 30%, in some embodiments it may be no more than about 25%, in some embodiments it may be no more than about 20%, in some embodiments it may be no more than about 15%, in some embodiments it may be no more than about 10%, in some embodiments it may be no more than about 5% and in some embodiments it may be no more than about 1% of the total weight of the plant-based formulation and/or plant-based yogurt.

In some embodiments, the method of culturing the mixture into a yogurt-like product may comprise the steps of: a) heating the mixture at 185° F. for 30 seconds while stirring; b) covering the resultant mixture and allowing it to cool at 105° F.; c) adding yogurt cultures to the resultant mixture; and d) incubating the resultant mixture at 108° F. for 24 hours.

In some embodiments, the ultimate pH of the yogurt-like product may be below 4.5. In some embodiments, sugar may be added. In some embodiments, the weight of the added sugar may be at least about 10% of the weight of the plant-based derivative. In some embodiments, the additive may comprise an amino acid. In some embodiments, the additive may be a combination of multiple amino acids. In some embodiments, the additive may comprise at least one of l-methionine, l-serine, or l-threonine. In some embodiments, the amount of amino acid added may be at least about 0.5% of the weight of the plant-based derivative, and, in some embodiments, riboflavin and/or niacin may be further added to the amino acids. In some embodiments, the additive may comprise potassium phosphate.

Some embodiments provide a formulation comprising, by weight, about: a) 30% purified pea protein paste; b) 6.6% cane sugar; c) 1% sunflower oil; d) 0.1% sunflower lecithin; e) 0.00007% riboflavin; f) 0.0007% niacin; g) 0.11% potassium phosphate monobasic; h) 0.0076% l-methionine; i) 0.0053% l-serine; j) 0.006% l-threonine; and k) 0.51% yogurt cultures.

Some embodiments provide a formulation comprising, by weight, about: a) protein paste; b) cane sugar; c) sunflower oil; d) sunflower lecithin; e) riboflavin; f) niacin; g) potassium phosphate monobasic; h) l-methionine; i) l-serine; j) l-threonine; and k) yogurt cultures. Some embodiments provide a formulation comprising, by weight one or more of the following: a) protein paste; b) cane sugar; c) sunflower oil; d) sunflower lecithin; e) riboflavin; f) niacin; g) potassium phosphate monobasic; h) l-methionine; i) l-serine; j) l-threonine; and k) yogurt cultures. In some embodiments, the protein paste is made from a purified pea paste. However, other plant proteins pastes or sources are contemplated. Exemplary pastes are disclosed in U.S. provisional patent application Ser. No. 62/276,030. In some embodiments, the purified pea protein paste may contain at least water, pea protein of between 15 to 20% by weight of the total weight of the paste and pea fat of between 1 to 2.5% by weight of the total weight of the paste. Some embodiments provide a formulation comprising, by weight of the total formulation one or more of the following: a) pea protein paste (between 25% to 35%); b) cane sugar (between 3% to 8%); c) sunflower oil (between 0.5% to 6%); d) sunflower lecithin (between 0.0% to 0.3%); e) riboflavin (0% to 0.001%); f) niacin (between 0% to 0.001%); g) potassium phosphate monobasic (between 0.1% to 1%); h) l-methionine (between 0% to 0.1%); i) l-serine (between 0% to 0.1%); j) l-threonine (between 0% to 0.1%); and k) yogurt cultures (between 0.5% to 2%). It is to be understood that the plant based proteins or pastes may have variable properties (for example, different levels of protein) so the particular amount of paste added to the embodiments disclosed herein may depend on the particular lot of the plant based protein and its content.

As well as the embodiments discussed in the summary, other embodiments are disclosed in the specification, drawings and claims. The summary is not meant to cover each and every embodiment; combination or variations are contemplated with the present disclosure.

BRIEF DESCRIPTION OF THE DRAWINGS

Embodiments of the present disclosure are described, by way of example only, with reference to the accompanying figures.

FIG. 1 shows the ingredients and amounts of one embodiment described herein.

DETAILED DESCRIPTION

Figure 2:
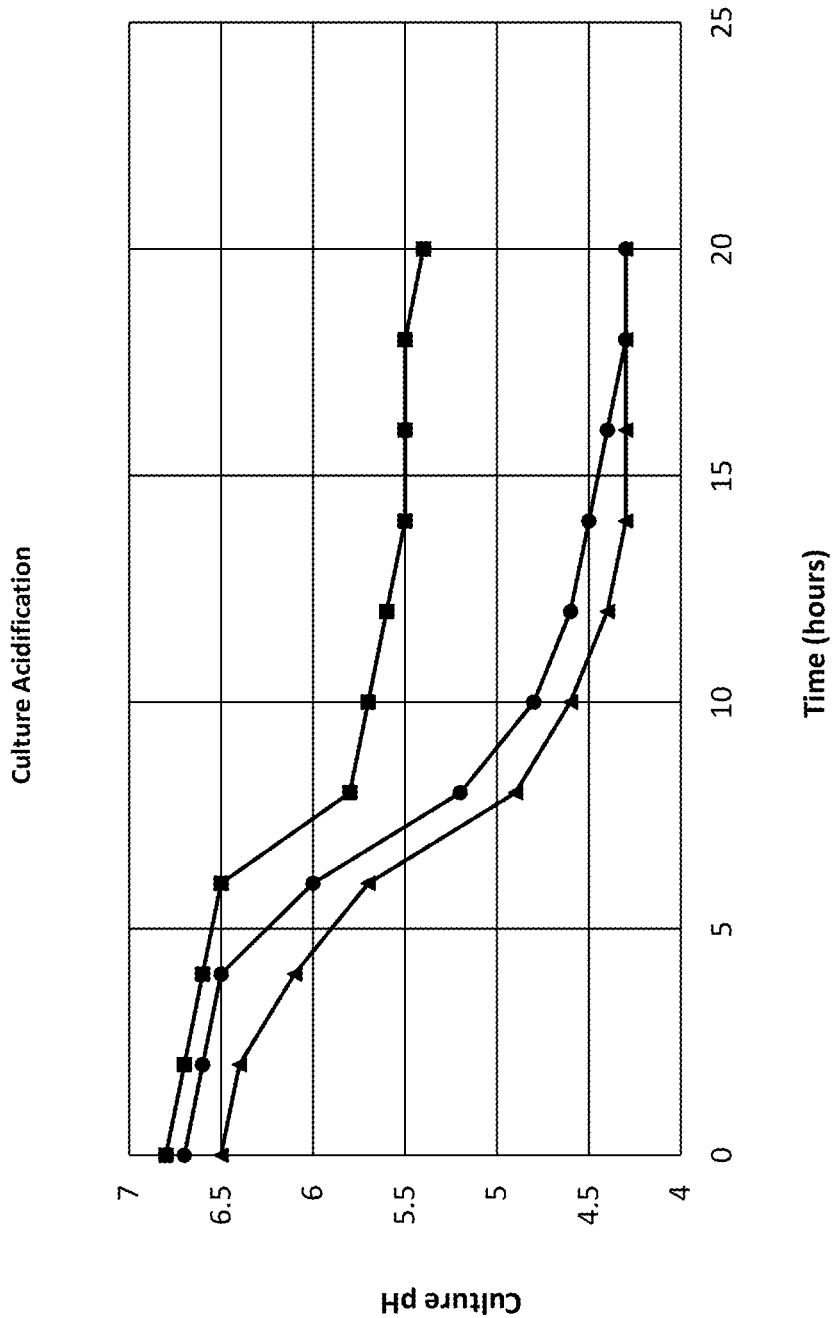
FIG. 2 depicts pH as a function of time of three different yogurt formulations incubated for 20 hours. The squares show the pH of a formulation containing purified pea protein, cane sugar, sunflower lecithin, and sunflower oil. The circles show the pH of the formulation described in FIG. 1. The triangles show the pH of a typical dairy formulation.

The present disclosure is described in further detail with reference to one or more embodiments, some examples of which are illustrated in the accompanying drawings. The examples and embodiments are provided by way of explanation and are not to be taken as limiting to the scope of the disclosure. Furthermore, features illustrated or described as part of one embodiment may be used by themselves to provide other embodiments and features illustrated or described as part of one embodiment may be used with one or more other embodiments to provide further embodiments. The present disclosure covers these variations and embodiments as well as other variations and/or modifications.

The term "protein isolate" as used herein refers to the protein material that is obtained from a natural source and/or modified natural source upon removal of at least a portion of (or a substantial portion of) one or more of the following: insoluble polysaccharide, soluble carbohydrate, ash, and other minor constituents. It typically has at least about 5%, 10%, 20%, 30%, 40%, 50%, 60%, 70%, 80%, or 90% by weight of protein.

The term "comprise" and its derivatives (e.g., comprises, comprising) as used in this specification is to be taken to be inclusive of features to which it refers, and is not meant to exclude the presence of additional features unless otherwise stated or implied.

The term "complex amino acid mixture" as used in the present disclosure refers to a material that is obtained from a natural source and/or modified natural source that contains one or more free amino acids, amino acid containing peptides, amino acid containing protein fragments, hydrolysates, extracts and combinations thereof.

The term "actual protein" as used herein refers to the total amount of protein in a material or a composition.

The term "fermented protein" as used herein refers to the protein material that has been cultured and/or fermented by one or more microorganisms. The protein material may or may not be partially and/or fully denatured, partially and/or fully degraded, partially and/or fully hydrolyzed, partially and/or fully truncated, partially and/or fully aggregated, partially and/or fully modified, and/or unchanged or combinations thereof.

The term "gelled protein" as used herein refers to the protein material that has formed or been fully and/or partially incorporated into a gel or a gel-like structure. The gel may be a hydrogel. The gel by be a covalent network. The gel may be crosslinked. The gel may be a non-covalent network. The gel may be one or more of the following: a hydrogel, a covalent network, a crosslinked network, and a non-covalent network. The gel may contain other materials including, but not limited to, oils, fats, proteins, emulsifiers, soluble materials (e.g. sugar, salts, flavorings), gums, and/or hydrocolloids.

As used in this application, the singular form "a", "an" and "the" include plural references unless the context clearly dictates otherwise.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The subject headings used in the detailed description are included for the ease of reference of the reader and should not be used to limit the subject matter found throughout the disclosure or the claims. The subject headings should not be used in construing the scope of the claims or the claim limitations.

Dairy yogurt may be made by fermenting milk, using bacteria cultures to convert milk sugars (lactose) into organic acids such as lactic and acetic acid. In one method of producing yogurt, the milk is heated to about 85-100° C. to denature the milk proteins, which allows them to set into gel-like structures during the fermentation. Then the culture is cooled to about 37-45° C. and the microbial cultures are added. The yogurt cultures may consist of a mixed population of *Lactobacillus* and *Streptococcus* strains, which work synergistically to acidify the culture, creating the characteristic yogurt tang.

One procedure for producing yogurt involves six steps:
1) Blending the protein in 120° F. water and allowing it to hydrate for about 5 minutes while under shear;
2) Adding oil to the mixture under shear;
3) Adding cane sugar to the mixture under shear;
4) Heating to about 185° F. and stirring constantly for 30 seconds;
5) Covering with the mixture and cooling to 105° F.; and
6) Adding yogurt cultures and incubating at 108° F. for 24 hours.

Another procedure for producing yogurt involves six steps:
1) Mixing protein in water;
2) Adding oil to the mixture;
3) Adding cane sugar to the mixture;
4) Heating to about 85° C. for 30 seconds;
5) Cooling to 42° C.; and
6) Adding yogurt cultures and incubating at 42° C. for 24 hours.

Other procedures are provided herein. Applying one or more of these processes to plant-based formulations for use in producing yogurts, dairy-free formulations for use in producing yogurts, substantially dairy-free yogurts, or an essentially dairy-free base, however, proved unworkable. For instance, culturing a base yogurt formulation containing purified pea protein and/or pea protein isolate, cane sugar, sunflower lecithin, and sunflower oil in the manner described above resulted in a plant-based yogurt that had a poor taste. The inventors identified that such a formulation would typically only reach a terminal pH of about 5.4 (vs ~3.8-4.3 in a dairy culture) and produced about 50% of the lactic acid found in dairy yogurts.

The term "substantially dairy-free" or "essentially dairy-free" as used in the present disclosure means that the yogurt product or formulation has less than 5% by weight of milk-based ingredients.

The term "dairy-free" as used in the present disclosure means that the yogurt product or formulation has no or less then 0.5% by weight of milk-based ingredients. It was believed that the problem in the taste of yogurt that is substantially dairy-free is the inability of yogurt cultures to grow and produce sufficient levels of organic acids. Regardless of the particular reason that such yogurts taste odd, the inventors have identified that adding one or more ingredients—which, when added to base formulations, allow the fermentation to proceed to more typical terminal pH's and organic levels—improves the taste of yogurt that is substantially dairy-free or dairy-free. Beneficial additives include complex amino acid mixtures, vitamins, minerals, and acids to the base formulation. Specific embodiments are described herein.

In plant-based embodiments, the formulations and/or plant-based yogurt may use a single-plant or they may come from combining multiple plants to form the base. The formulations may also contain yogurt cultures. In some embodiments, the formulations and/or plant-based yogurt may also contain fragrances, natural thickening agents, fats, water, and/or oils. In some embodiments, the formulation and/or plant-based yogurt may contain acids, yeasts and/or yeast extracts, sweetening agents, emulsifiers, standard commercial natural and/or artificial flavors, certified colors and/or vitamins.

In one embodiment, the formulation contains a pea-based paste, water, sugar, sunflower oil, riboflavin, niacin, potassium phosphate monobasic, l-methionine, l-serine, l-threonine, and yogurt cultures. In one embodiment, the formulation contains a pea protein isolate, water, sugar, sunflower oil, riboflavin, niacin, potassium phosphate monobasic, l-methionine, l-serine, l-threonine, and yogurt cultures. However, the present disclosure is not limited to a particular embodiment.

Various plants and/or protein isolates may be used, including melon, barley, coconut, rice, pear, emmer, carrot, lupin seeds, pea, fennel, lettuce, oat, cabbage, celery, soybeans, almond, rice, flax, potato, sunflower, mushroom, or combinations thereof. Of course, other suitable plants and/or protein isolates are also acceptable. In some embodiments, the amount of plant-based derivative may comprise at least about 10% by weight of the ultimate formulation; in some embodiments the amount of plant-based derivative may comprise at least about 15% by weight of the ultimate formulation and/or plant-based yogurt; in some embodiments the amount of plant-based derivative may comprise at least about 20% by weight of the ultimate formulation and/or plant-based yogurt; in some embodiments it may comprise at least about 25% by weight of the ultimate formulation; and in some embodiments it may comprise at least about 30% by weight of the ultimate formulation and/or plant-based yogurt. In some embodiments, the amount of plant-based derivative may be, about, 20, 21, 22, 23, 24, 25, 26, 27, 28, 29, 30, 31, 32, 33, 34, 35, 36, 37, 38, 39, or 40% of the weight of the total formulation and/or plant-based yogurt. In some embodiments, the amount of plant-based derivative may be, between 15-20%, 20-25%, 25-30%, 30-35%, or 35-40% of the weight of the total formulation and/or plant-based yogurt.

In some embodiments, the amount of plants and/or protein isolate may comprise at least about 1% by weight of the plant-based yogurt formulation and/or yogurt; in some embodiments the amount of plant-based derivative and/or protein isolate may comprise at least about 5% by weight of the plant-based yogurt formulation and/or yogurt; in some embodiments the amount of plant-based derivative and/or protein isolate may comprise at least about 10% by weight of the plant-based yogurt formulation and/or yogurt; in some embodiments it may comprise at least about 20% by weight of the plant-based yogurt formulation and/or yogurt; in some embodiments it may comprise at least about 40% by weight of the plant-based yogurt formulation and/or yogurt; in some embodiments it may comprise at least about 60% by weight of the plant-based yogurt formulation and/or yogurt; in some embodiments it may comprise at least about 80% by weight of the plant-based yogurt formulation and/or yogurt; and in some embodiments it may comprise at least about 90% by weight of the plant-based yogurt formulation and/or yogurt. In some embodiments, the amount of plant-based derivative may be, between 1-5%, 5-10%, 10-15%, 15-20%, 20-30%, 30-40%, 40-50%, 50-60%, 60-70%, 70-80%, or 80-90% of the weight of the total formulation and/or plant-based yogurt.

The percentage of protein in the plant-based derivative and/or protein isolate may also vary. In some embodiments, the protein percentage by weight of the plant-based derivative and/or protein isolate may be between about 5 and 30%, in other embodiments it may be between about 10 and 25%, in other embodiments it may be between about 15 and 20%, in other embodiments it may be between about 12 and 20%, and in other embodiments it may be, about, 10, 11, 12, 13, 14, 15, 16, 17, 18, 19, 20, 21, 22, 23, 24, or 25%. In some embodiments, a smaller quantity of a more concentrated plant-based derivative and/or protein isolate may perform substantially the same function in substantially the same way to obtain the same result in the final formulation. Thus, by way of example, a formulation using 10% by weight of the formulation of a plant-based paste and/or protein isolate that has a 20% protein content, by weight of the plant-based derivative and/or protein isolate, may be interchanged with a formulation using 20% by weight of a plant-based paste and/or protein isolate that has a 10% protein content. In some embodiments, the protein percentage by weight of the plant-based derivative and/or protein isolate may be between about 30 and 98%, in other embodiments it may be between about 50 and 95%, in other embodiments it may be between about 70 and 90%, in other embodiments it may be between about 75 and 85%, and in other embodiments it may be, about, 75, 76, 77, 78, 79, 80, 81, 82, 83, 84, or 85%.

In some embodiments, the percentage of protein may comprise at least about 1% by weight of the plant-based yogurt formulation and/or yogurt; in some embodiments the percentage of protein may comprise at least about 2% by weight of the plant-based yogurt formulation and/or yogurt; in some embodiments it may comprise at least about 4% by weight of the plant-based yogurt formulation and/or yogurt; in some embodiments it may comprise at least about 6% by weight of the plant-based yogurt formulation and/or yogurt; in some embodiments it may comprise at least about 8% by weight of the plant-based yogurt formulation and/or yogurt; and in some embodiments it may comprise at least about 10% by weight of the plant-based yogurt formulation and/or yogurt. In some embodiments, percentage of protein may be, about, 1, 2, 3, 4, 5, 6, 7, 8, 9, or 10% of the weight of the total formulation and/or plant-based yogurt.

The percentage of protein in the plant-based derivative may also vary. In some embodiments, the protein percentage by weight of the plant-based derivative may be between about 5 and 30%, in other embodiments it may be between about 10 and 25%, in other embodiments it may be between about 15 and 20%, in other embodiments it may be between about 12 and 20%, and in other embodiments it may be, about, 10, 11, 12, 13, 14, 15, 16, 17, 18, 19, 20, 21, 22, 23, 24, or 25%. In some embodiments, a smaller quantity of a more concentrated plant-based derivative may perform substantially the same function in substantially the same way to obtain the same result in the final formulation. Thus, by way of example, a formulation using 10% by weight of the formulation of a plant-based paste that has a 20% protein content, by weight of the plant-based derivative, may be interchanged with a formulation using 20% by weight of a plant-based paste that has a 10% protein content.

Different yogurt cultures may be used, including commercially available ones. For instance, Vivolac, Chr. Hansen, Bella and Bella, and GI ProStart make dairy-free yogurt cultures.

Different flavors may be used. Some exemplary ones include: honey; vanilla; fruit prep (blueberry, strawberry, raspberry, etc); mango, citrus (lemon, orange, etc); coconut; passion fruit; peach, combinations of flavors and so forth.

Different thickening agents may be used, including gelatin, pectin, agar, gums, starches, and ultra-gel. Examples of acceptable gums include sodium alginate, xanthan gum, guar gum or combinations thereof. Examples of acceptable starches include tapioca starch, arrowroot starch or combinations thereof.

Different fatty materials may be used. Some exemplary fatty materials include coconut oil, coconut cream, palm oil, canola oil, soybean oil or combinations thereof. Other plant based fatty materials are also contemplated.

Different oils may be used, including corn oil, sunflower oil, cotton seed oil, peanut oil, coconut oil, soy bean oil, other similar oils or combinations thereof. In some embodiments, the percentage of oil added may be between about 0.1 and 5% by weight. In other embodiments the percentage may be between about 0.3 and 4% by weight. In other embodiments the percentage may be between about 0.5 and 3% by weight. In other embodiments, the percentage of oil added may be between about 2.5 and 3%. In other embodiments, the percentage of oil added may be between about 2.3 and 3.4%. In other embodiments the percentage may be between about 0.8 and 2% by weight. In some embodiments the percentage may be, about, 0.5, 0.6, 0.7, 0.8, 0.9, 1, 1.1, 1.2, 1.3, 1.4, 1.5, 2, 2, 3, 2.5, 2.7, 3, 3.2, 3.4, 3.6, 3.8 or 4% by weight.

Different sweetening materials may be used, including honey, sugar, glucose, invert sugar, dextrose, or combinations thereof. In some embodiments, cane sugar is used. In some embodiments, the amount of sweetening materials may be about 1, 1.5, 2, 2.5, 3, 3.5, 4, 4.5, 5, 5.5, 6, 6.5, 7, 7.5, 8, 8.5, or 9% by weight of the ultimate formulation and/or plant-based yogurt.

Different emulsifiers may be used, including various lecithins, such as egg yolk emulsifying lecithin, sunflower lecithin, and soy lecithin, honey, CSL calcium stearoyl di-laciate, polyglycerol ester, sorbitan ester, PG ester, sugar ester, monoglyceride, acetylated monoglyceride, lactylated monoglyceride or combinations thereof. In some embodiments, the amount of emulsifier may be about between about 0.01 and 1% of the weight of the formulation and/or plant-based yogurt. In some embodiments, the amount of emulsifier may be about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2% of the weight of the formulation and/or plant-based yogurt.

In some embodiments, probiotic bacteria may also be added.

Different complex amino acid mixtures may be used, including yeast, yeast extract, hydrolyzed soy protein, hydrolyzed pea protein, corn steep liquor, meat extract, peptone, casein hydrolysate, lactalbumin hydrolysate, soytone, tryptone or combinations thereof. In some embodiments, the amount of complex amino acid mixture may be about between about 0.01 and 1% of the weight of the formulation and/or plant-based yogurt. In some embodiments, the amount of complex amino acid mixture may be about 0.01, 0.02, 0.03, 0.04, 0.05, 0.06, 0.07, 0.08, 0.09, 0.1, 0.15, 0.2, 0.25, 0.3, 0.4, 0.5, 0.6, 0.7, 0.8, 0.9, or 1.0% of the weight of the formulation and/or plant-based yogurt.

In some embodiments, riboflavin, niacin, potassium phosphate monobasic, phosphate salts (sodium phosphate monobasic, sodium phosphate dibasic, potassium phosphate monobasic, potassium phosphate dibasic, ammonium phosphate, magnesium phosphate), citrate salts (sodium citrate, potassium citrate, ammonium citrate, magnesium citrate), other buffer salts, ammonium chloride, thiamine, B12, pantothenic acid, myo-Inositol, biotin or combinations thereof may be included. In some embodiments, these ingredients may be added in solid, paste, and/or liquid form.

In some embodiments, these ingredients may be added dissolved in an aqueous solution. When using, for example, a 0.7 mg/mL stock concentration of riboflavin, the weight concentration of riboflavin solution to add, as a percentage of the weight of the total base formulation and/or plant-based yogurt, may be, in some embodiments, between about 0.02 and 0.2%. In other embodiments, the weight concentration of the stock solution as a percentage of the weight of the base formulation and/or plant-based yogurt may be between about 0.05 and 0.15%. In other embodiments, the weight concentration of the stock solution as a percentage of the weight of the base formulation and/or plant-based yogurt may be between about 0.08 and 0.12%. In other embodiments, the weight concentration of the stock solution as a percentage of the weight of the base formulation and/or plant-based yogurt may be between about 0.09 and 0.11%. In other embodiments, the weight concentration of the stock solution as a percentage of the weight of the base formulation and/or plant-based yogurt may be about 0.05, 0.06, 0.07, 0.08, 0.09, 0.1, 0.11, 0.12, 0.13, 0.14, 0.15, 0.16, 0.17, 0.18, 0.19 or 0.2%.

In some embodiments, the amount of riboflavin added may be between about 0.05 and 0.5% of the weight of the plant-based derivative. In other embodiments, the amount may be about 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, or 0.3% of the weight of the plant-based derivative. In some embodiments, the amount of riboflavin added may be between about 0.05 and 10 parts per million (ppm) of the weight of the ultimate formulation and/or plant-based yogurt. In other embodiments, the amount may be about 0.1, 0.2, 0.3, 0.4, 0.5, 0.6, 0.7, 0.8, 0.9, 1, 2, 3, 4, 5, 6, 7, 8, 9, or 10 ppm of the weight of the ultimate formulation and/or plant-based yogurt.

When using, for example, a 7 mg/mL stock concentration of niacin, the weight concentration of niacin solution to add, as a percentage of the weight of the total base formulation and/or plant-based yogurt, may be, between about 0.02 and 0.2%. In other embodiments, the weight concentration of the stock solution as a percentage of the weight of the base formulation and/or plant-based yogurt may be between about 0.05 and 0.15%. In other embodiments, the weight concentration of the stock solution as a percentage of the weight of the base formulation and/or plant-based yogurt may be between about 0.08 and 0.12%. In other embodiments, the weight concentration of the stock solution as a percentage of the weight of the base formulation and/or plant-based yogurt may be between about 0.09 and 0.11%. In other embodiments, the weight concentration of the stock solution as a percentage of the weight of the base formulation and/or plant-based yogurt may be about 0.05, 0.06, 0.07, 0.08, 0.09, 0.1, 0.11, 0.12, 0.13, 0.14, 0.15, 0.16, 0.17, 0.18, 0.19 or 0.2%.

In some embodiments, the amount of niacin added may be between about 0.5 and 5% of the weight of the plant-based derivative. In other embodiments, the amount may be about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3% of the weight of the plant-based derivative. In some embodiments, the amount of niacin added may be between about 1 and 20 parts per million (ppm) of the weight of the ultimate formulation and/or plant-based yogurt. In other embodiments, the amount may be about 1, 2, 3, 4, 5, 6, 7, 8, 9, 10, 15, or 20 parts per million (ppm) of the weight of the ultimate formulation and/or plant-based yogurt.

When using, for example, a 1 molar stock concentration of potassium phosphate monobasic, the weight concentration of potassium phosphate monobasic solution to add, as a percentage of the weight of the total base formulation and/or plant-based yogurt, may be between about 0.1 and 4%. In other embodiments, the weight concentration of the stock solution as a percentage of the weight of the base formulation and/or plant-based yogurt may be between about 0.5 and 3%. In other embodiments, the weight concentration of the stock solution as a percentage of the weight of the base formulation and/or plant-based yogurt may be between about 0.6 and 2%. In other embodiments, the weight concentration of the stock solution as a percentage of the weight of the base formulation and/or plant-based yogurt may be between about 0.7 and 1%. In other embodiments, the weight concentration of the stock solution as a percentage of the weight of the base formulation and/or plant-based yogurt may be about 0.5, 0.6, 0.7, 0.8, 0.9, and 1%.

In some embodiments, the amount of potassium phosphate monobasic added may be between about 0.05 and 0.5% of the weight of the plant-based derivative. In other embodiments, the amount may be about 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, or 4% of the weight of the plant-based derivative.

In some embodiments, the amount of phosphate salts, including sodium phosphate monobasic, sodium phosphate dibasic, potassium phosphate monobasic, potassium phosphate dibasic, ammonium phosphate, magnesium phosphate and/or other phosphate salts, may be between about 0.05 and 5% of the weight of the ultimate formulation and/or plant-based yogurt. In other embodiments, the amount may be about 0.1, 0.2, 0.3, 0.4, 0.5, 0.6, 0.7, 0.8, 0.9 or 1% of the weight of the ultimate formulation and/or plant-based yogurt.

In some embodiments, the amount of citrate salts, including sodium citrate, potassium citrate, ammonium citrate, magnesium citrate and/or other citrate salts, may be between about 0.05 and 5% of the weight of the ultimate formulation and/or plant-based yogurt. In other embodiments, the amount may be about 0.1, 0.2, 0.3, 0.4, 0.5, 0.6, 0.7, 0.8, 0.9 or 1% of the weight of the ultimate formulation and/or plant-based yogurt.

Different acids may be added. In some embodiments, the acids are amino-acids. Some embodiments utilize l-methionine, l-serine, l-threonine, combinations thereof, and/or casamino acids. In some embodiments, these ingredients are added dissolved in an aqueous solution. When using a 0.2 molar stock concentration of an amino acid, the weight concentration of the amino acid solution to add, as a percentage of the weight of the total base formulation and/or plant-based yogurt, may be between about 0.1 and 4%. In other embodiments, the weight concentration of the stock solution as a percentage of the weight of the base formulation and/or plant-based yogurt may be between about 0.3 and 3%. In other embodiments, the weight concentration of the stock solution as a percentage of the weight of the base formulation and/or plant-based yogurt may be between about 0.5 and 2%. In other embodiments, the weight concentration of the stock solution as a percentage of the weight of the base formulation and/or plant-based yogurt may be between about 0.6 and 1%. In other embodiments, the weight concentration of the stock solution as a percentage of the weight of the base formulation and/or plant-based yogurt may be about 0.25, 0.3, 0.35, 0.4, 0.45, 0.5, 0.55, 0.6, 0.65, 0.7, 0.75, 0.8, 0.85, 0.9, 0.95, or 1%.

In some embodiments, the amount of amino acids added may be between about 0.01 and 1% of the weight of the plant-based derivative. In other embodiments, the amount may be about 0.01, 0.02, 0.03, 0.04, 0.05, 0.06, 0.07, 0.08, 0.09, or 1% of the weight of the plant-based derivative. In some embodiments, the amount of each amino acid added may be between about 1 and 500 parts per million (ppm) of the weight of the ultimate formulation and/or plant-based yogurt. In other embodiments, the amount of each amino acid added may be about 50, 60, 70, 80, 90, 100, 120, 140, 160, 180, or 200 parts per million (ppm) of the weight of the ultimate formulation and/or plant-based yogurt. In some embodiments, the combination of amino acid may be a combination of l-methionine, l-serine, and l-threonine. The concentrations of the three amino acids may be equal or they may not be. Thus, in some embodiments the ratio of l-methionine to l-serine to l-threonine may be 1:1:1, 2:1:1, 1:2:1, 1:1:2, 2:2:1, 2:1:2, or 1:2:2, respectively. In some embodiments, a combination of threonine, methionine, serine, phosphate, citrate, niacin, and riboflavin may be added.

In some embodiments, a smaller quantity of a more concentrated solution of an additive may perform substantially the same function in substantially the same way to obtain the same result. Thus, for instance, 0.1% by weight of the final base formulation of a 7 mg/mL stock concentration of niacin may be equivalent to 0.05% by weight of the final base formulation of a 14 mg/mL stock concentration.

In some embodiments, a combination of yeast extract and potassium phosphate may be added. In other embodiments, a combination of yeast extract, potassium phosphate, and sodium citrate may be added. In some embodiments, a combination of threonine, methionine, serine and potassium phosphate may be added. In some embodiments, hydrolyzed soy protein and potassium phosphate may be added. In other embodiments, hydrolyzed pea protein and potassium phosphate may be added. Other combinations of these ingredients are also contemplated.

In some embodiments, a plant-based yogurt formulation containing plant protein isolate and one or more of the following nutrients: complex amino acid mixtures, vitamins, minerals, and acids, is cultured to form a plant-based yogurt analog containing about 1% (w/w) actual protein and greater than or equal to 0.25% (w/w) lactic acid. In other embodiments the plant-based yogurt analog contains about 1.5% (w/w) actual protein and greater than or equal to 0.3% (w/w) lactic acid, about 2% (w/w) actual protein and greater than or equal to 0.35% (w/w) lactic acid, about 2.5% (w/w) actual protein and greater than or equal to 0.4% (w/w) lactic acid, about 3% (w/w) actual protein and greater than or equal to 0.45% (w/w) lactic acid, about 3.5% (w/w) actual protein and greater than or equal to 0.5% (w/w) lactic acid, about 4% (w/w) actual protein and greater than or equal to 0.55% (w/w) lactic acid, about 4.5% (w/w) actual protein and greater than or equal to 0.6% (w/w) lactic acid, about 5% (w/w) actual protein and greater than or equal to 0.65% (w/w) lactic acid, about 5.5% (w/w) actual protein and greater than or equal to 0.7% (w/w) lactic acid, about 6% (w/w) actual protein and greater than or equal to 0.75% (w/w) lactic acid, about 6.5% (w/w) actual protein and greater than or equal to 0.8% (w/w) lactic acid, about 7% (w/w) actual protein and greater than or equal to 0.85% (w/w) lactic acid, about 7.5% (w/w) actual protein and greater than or equal to 0.9% (w/w) lactic acid, about 8% (w/w) actual protein and greater than or equal to 0.95% (w/w) lactic acid, about 8.5% (w/w) actual protein and greater than or equal to 1% (w/w) lactic acid, about 9% (w/w) actual protein and greater than or equal to 1.05% (w/w) lactic acid, about 9.5% (w/w) actual protein and greater than or equal to 1.1% (w/w) lactic acid, about 10% (w/w) actual protein and greater than or equal to 1.15% (w/w) lactic acid.

In some embodiments, the protein may be gelled. In other embodiments, the protein may be fermented. In some embodiments, the protein may be gelled and/or fermented. In some embodiments, a gelled and/or fermented protein results from culturing a formulation.

In some embodiments, the yogurt analog may be a liquid. In some embodiments, the yogurt analog may be a drinkable liquid, in other embodiments it may be a thick liquid, in other embodiments it may be a thin liquid, in other embodiments it may be a semi-solid, in other embodiments it may be a solid, in other embodiments it may be a gel, in other embodiments it may be a paste. In some embodiments, the yogurt analog may be Greek style.

In some embodiments plant-based milks may be added. The plant base of these milks may include soy, rice, almond, flax, coconut, sunflower, pea, cashew, peanut, and/or combinations thereof. In some embodiments, the amount of plant-based milks may be between 1-20% (w/w) of the plant-based yogurt formulation. In other embodiments, the amount may be between 20-40%, 40-60%, 60-80%, or 80-99% (w/w). In some embodiments, the amount may be 85, 86, 87, 88, 89, 90, 91, 92, 93, 94, 95, 96, 97, 98, or 99% (w/w).

Figure 3:
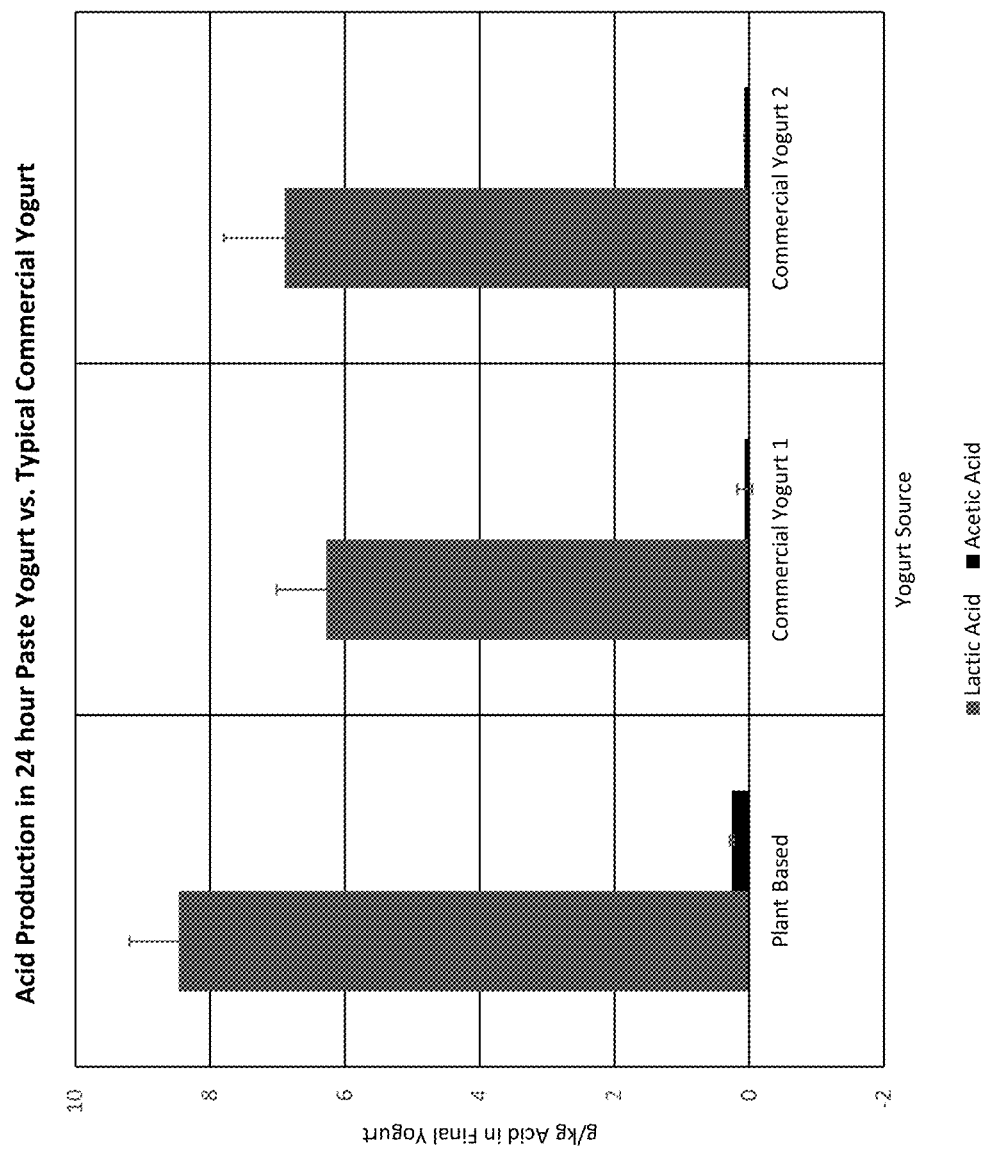
FIG. 3 depicts the lactic acid and acetic acid produced in 24 hours by the formulation described in FIG. 1 as compared with two commercial dairy yogurt formulations. The bar, on the left, shows the amounts of lactic acid. The bar, on the right, represents acetic acid.

FIG. 1 provides an exemplary embodiment of a formulation. FIG. 2 shows an example of how this embodiment improves culture acidification during fermentation resulting in a lower terminal pH as compared to a base formula. The incubation time was 20 hours. FIG. 3 shows that the embodiment is also able to achieve lactic acid levels similar to that found in two commercial dairy yogurts (i.e., yogurt 1 is Dannon OIKOS Greek Nonfat and yogurt 2 is Brown Cow Plain Nonfat). Under each of the three samples there are two bars the one of the left is the lactic acid level and the one on the right is the acetic acid level. The plant-based yogurt shown on the left hand side of FIG. 3 is the formulation provided in FIG. 1 and was prepared by: a) heating the mixture at 185° F. for 30 seconds while stirring; b) covering the resultant mixture and allowing it to cool at 105° F.; c) adding yogurt cultures to the resultant mixture; and d) incubating the resultant mixture at 108° F. for 24 hours.

EXAMPLES

The present disclosure will now be described with reference to specific example(s), which should not be construed as in any way limiting.

Example 1. Yogurt Analog

In this example, a base yogurt formulation was prepared that contained pea protein, cane sugar, sunflower lecithin and sunflower oil. This formula was cultured using a typical small-scale yogurt procedure:
1) Mix pea protein in water for 5 minutes.
2) Add sunflower oil to mixture.
3) Add the cane sugar to mixture.
4) Heat to 85° C. while mixing, hold for 30 seconds.
5) Cool to 42° C.
6) Add yogurt cultures and incubate at 42° C. for 24 hours This type of formulation would typically only reach a terminal pH of about 5.4 (vs ~3.8-4.3 in a dairy culture) and produce about 50% (w/w) of the lactic acid found in dairy yogurts. Dairy milk contains a complement of free amino acids, vitamins, and other nutrients which yogurt bacteria utilize for growth. This was confirmed by adding to the above plant-based formula a small amount of dairy milk and the modified plant-based formula achieved typical lactic acid concentrations and low pH.

Nutrient Supplementation

Since the fermentation appeared to be stalled due to nutrient limitations, the inventors screened a wide array of nutrients to find one or more combinations that would allow the strains to grow well and properly acidify the culture. The screening efforts identified several nutrients which, when added to the plant-base formulation, allowed the fermentation to proceed to a more typical terminal pH and organic acid levels. The inventors surprisingly discovered that adding one or more of the following nutrients: 1. Complex amino acid mixtures (e.g. yeast, yeast extract, hydrolyzed soy protein, hydrolyzed pea protein, corn steep liquor, meat extract, peptone, casein hydrolysate, lactalbumin hydrolysate, soytone, tryptone), 2. Amino acids (e.g. threonine, methionine, and/or serine) and 3. Vitamins (e.g. niacin and/or riboflavin) to the plant-based formulation that the formulation was able to achieve near-normal growth as well as acidification.

Buffer Capacity

Dairy milk is able to buffer the drop in pH deriving from lactic acid production by the fermenting bacteria. Traditional, unpurified plant milks like soy milk are also able to provide buffering, though to a lesser degree than dairy. However, the purification of plant proteins reduces their ability of these solutions to buffer pH drop. During the bacterial fermentation, this causes the culture media to acidify rapidly, limiting the growth of the bacterial culture and negatively affecting the development of lactic acid and/or flavor compounds. Addition of buffering agents caused the pH to drop more slowly and allow for better bacterial growth, leading to higher lactic acid concentrations. Combining the buffer agents (potassium phosphate, 0.15% w/w) with the nutrients identified above further aided the fermentation of the plant-based formulation.

FIG. 1 shows the formulation for the example yogurt analog.

FIG. 2 shows the improvement in culture acidification that is achieved with nutrient and buffer supplementation of an exemplary embodiment. The pH change in the basic plant-based formula is shown in the line with solid circles.

The pH starts at about 6.8 and is just under 5.5 after 20 hours of fermentation. The pH change in the planted-based formula with supplements added, according to certain embodiments, is shown in the line with squares. The pH starts at about 6.7 and after 20 hours the pH is 4.3. The pH change in a typically dairy formula (2% dairy milk) is shown in the line with triangles and starts at about 6.5 and after 20 hours the pH is 4.3. The supplemented fermentation of the plant-based formulation resulted in a lower terminal pH as compared to the plant-base formulation without supplements.

FIG. 3 shows that the lactic acid level in nutrient and buffer supplemented plant-based yogurt formulation is similar to what is found in commercial dairy yogurts. Three yogurts are shown, a plant-based yogurt produced according to certain embodiments and two commercial diary-based yogurts. Commercial yogurt 1 is Dannon OIKOS Greek Nonfat and commercial yogurt 2 is Brown Cow Plain Nonfat. The larger bars on the left of each of the three bar groupings show the amount of lactic acid present and the small bars on the right of each of the three bar groupings show the amount of acetic acid present.

Figure 4:
FIG. 4 shows the effect of increasing buffer capacity has in plant-based yogurt formulations has on lactic acid production, according to certain embodiments.

FIG. 4 shows the effect of increasing buffer capacity on the percentage (w/w) of lactic acid production in an exemplary embodiment. As shown in FIG. 4, the amount of potassium phosphate was in increased from 0% (w/w) (step 1), to 0.1% (w/w) (step 2), to 0.2% (w/w) (step 3) to 0.9% (w/w) (step 4) and to 1.8% (w/w) (step 5). The increase in buffer capacity resulted in an increase in lactic acid production.

Table 1 below provides some exemplary embodiment formulations for certain of the plant-based yogurt formulations and/or plant-based yogurts disclosed herein. The percentages given in Table 1 are weight/weight.

TABLE 1

| Ingredient | Product A | Product B | Product C | Product D | Product E |
|---|---|---|---|---|---|
| Pea Protein Isolate (as % Protein) | 4% | 4% | 4% | 4% | 4% |
| Cane Sugar | 6.5% | 6.5% | 6.5% | 6.5% | 6.5% |
| Sunflower oil | 1.% | 1% | 1% | 1% | 1% |
| Sunflower lecithin | 0.11% | 0.11% | 0.11% | 0.11% | 0.11% |
| Non-dairy starter culture | 0.1% | 0.1% | 0.1% | 0.1% | 0.1% |
| Yeast Extract | | | | | 0.1% |
| Riboflavin | 0.7 ppm | | 0.7 ppm | 1.5 ppm | |
| Niacin | 7 ppm | | 7 ppm | 20 ppm | |
| Methionine | 75 ppm | 75 ppm | 100 ppm | 100 ppm | |
| Serine | 53 ppm | 53 ppm | 100 ppm | 100 ppm | |
| Threonine | 60 ppm | 60 ppm | 100 ppm | 100 ppm | |
| Potassium phosphate | 0.14% | 0.30% | | 0.1% | 0.5% |
| Sodium citrate | | | 0.1% | | |

Example 2. Lactic Acid Production Over a Range of Protein Concentrations

Figure 5:
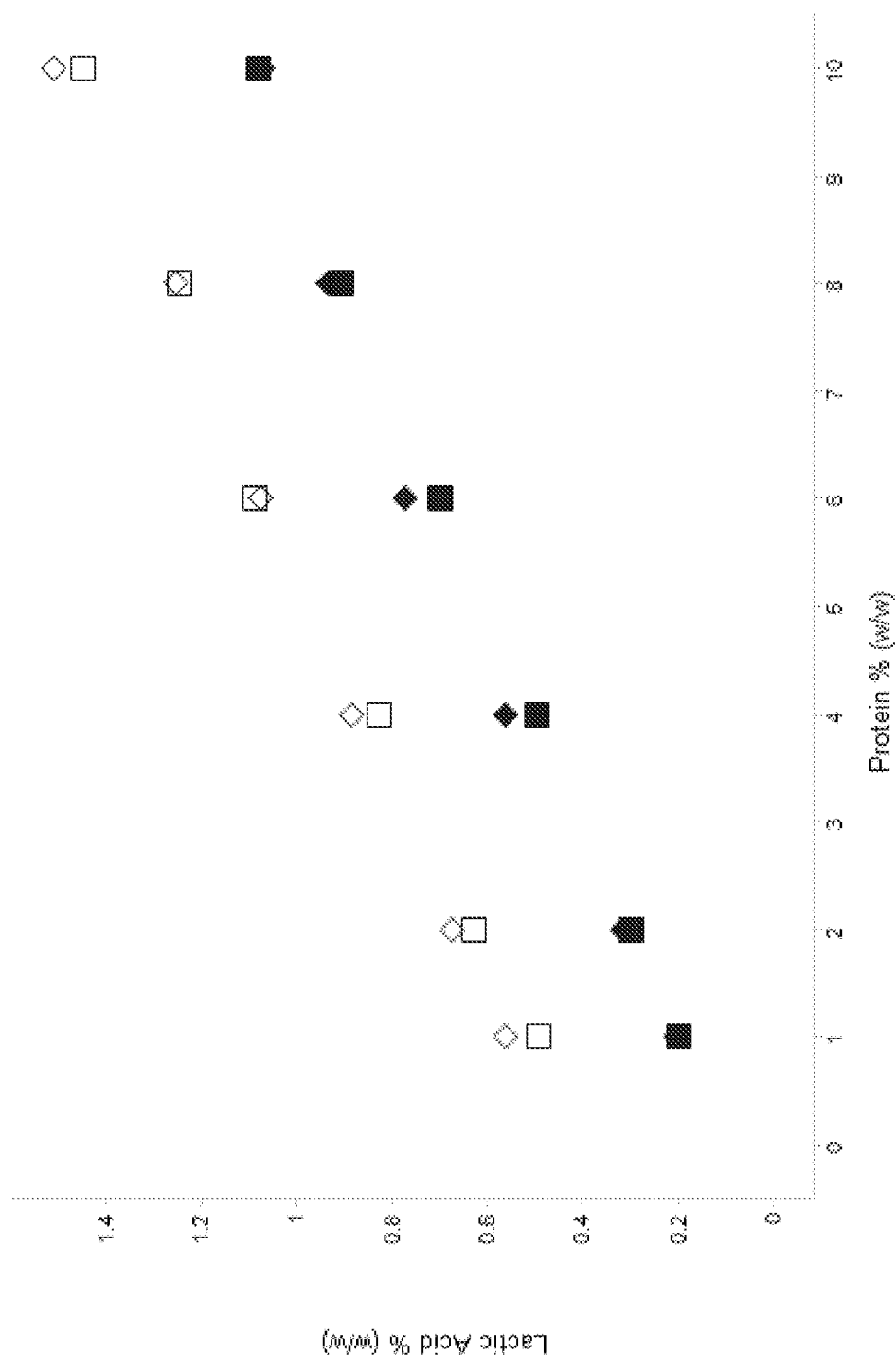
FIG. 5 shows the increase in lactic acid concentration across a range of protein concentrations, according to certain embodiment.

One measure of fermentation in a plant-based yogurt is the production of certain amounts of lactic acid. However, using protein isolates alone the lactic acid concentration may be deficient. This example shows an increase in the production of lactic acid across a range of protein concentrations by supplementing the fermentation. FIG. 5 shows production of lactic acid after fermentation in a fat-free yogurt formulation (Table 2) at protein isolate levels from 1%, 2%, 4%, 6%, 8%, and 10% (w/w as actual protein). Two commercial pea protein isolates were used, World Food Pea Protein Isolate (diamonds) and Now Sports Pea Protein Isolate (squares). The open symbols indicate formulations with added supplements. The filled symbols indicate formulations without supplementation. Supplementation increased the lactic acid concentration at each protein concentration by about 0.35% (w/w).

TABLE 2

| Ingredient | Unsupplemented % is w/w | Supplemented % is w/w |
|---|---|---|
| Pea Protein Isolate (as % actual Protein) | 1-10% | 1-10% |
| Cane Sugar | 5% | 5% |
| Non-dairy starter culture | 0.02% | 0.02% |
| Yeast Extract | | 0.2% |
| Potassium phosphate | | 0.3% |

Example 3. Lactic Acid Production with Varying Plant Protein Sources

Figure 6:
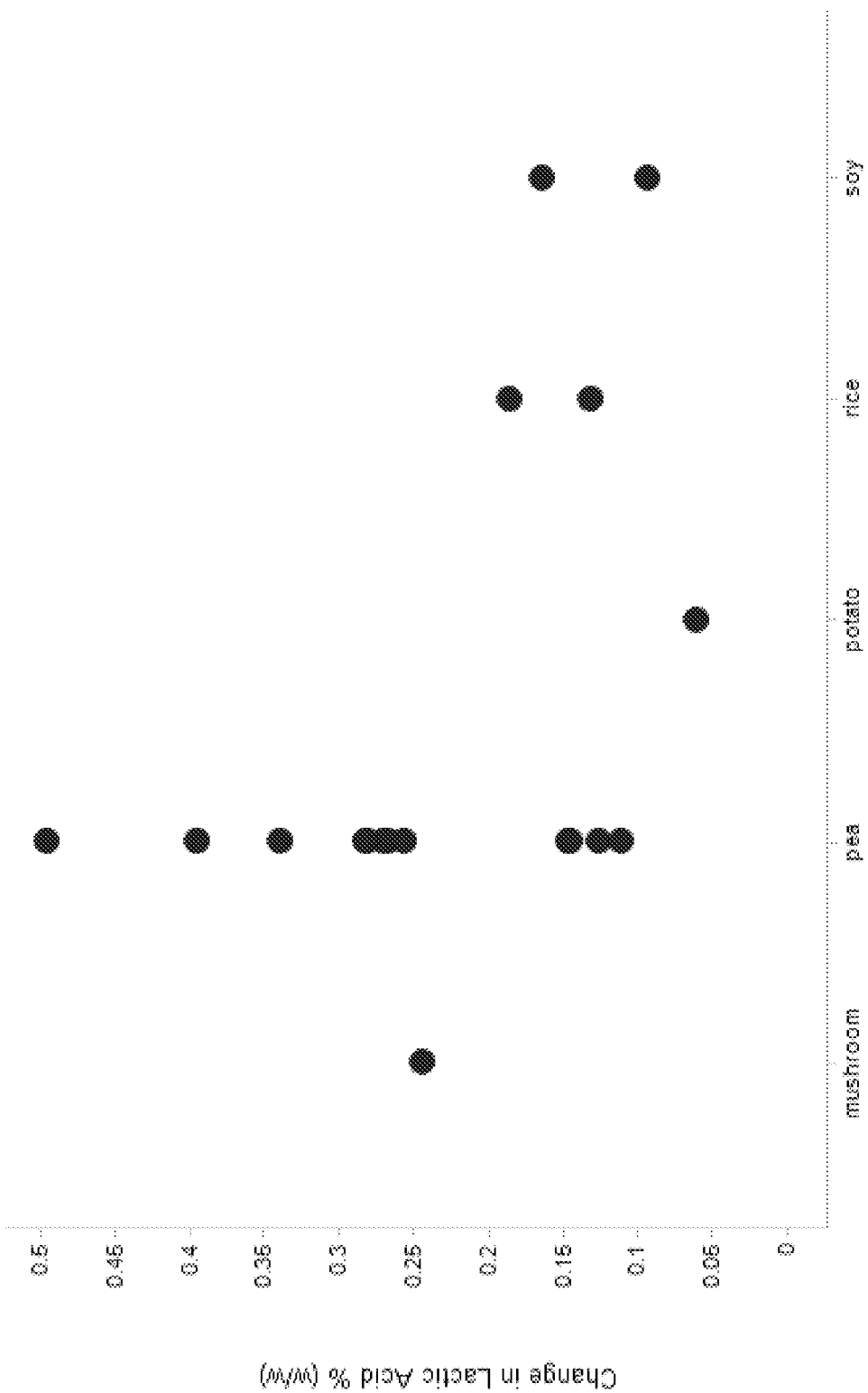
FIG. 6 shows the increase in lactic acid concentration using a range of plant protein isolates, according to certain embodiments.
Figure 7:
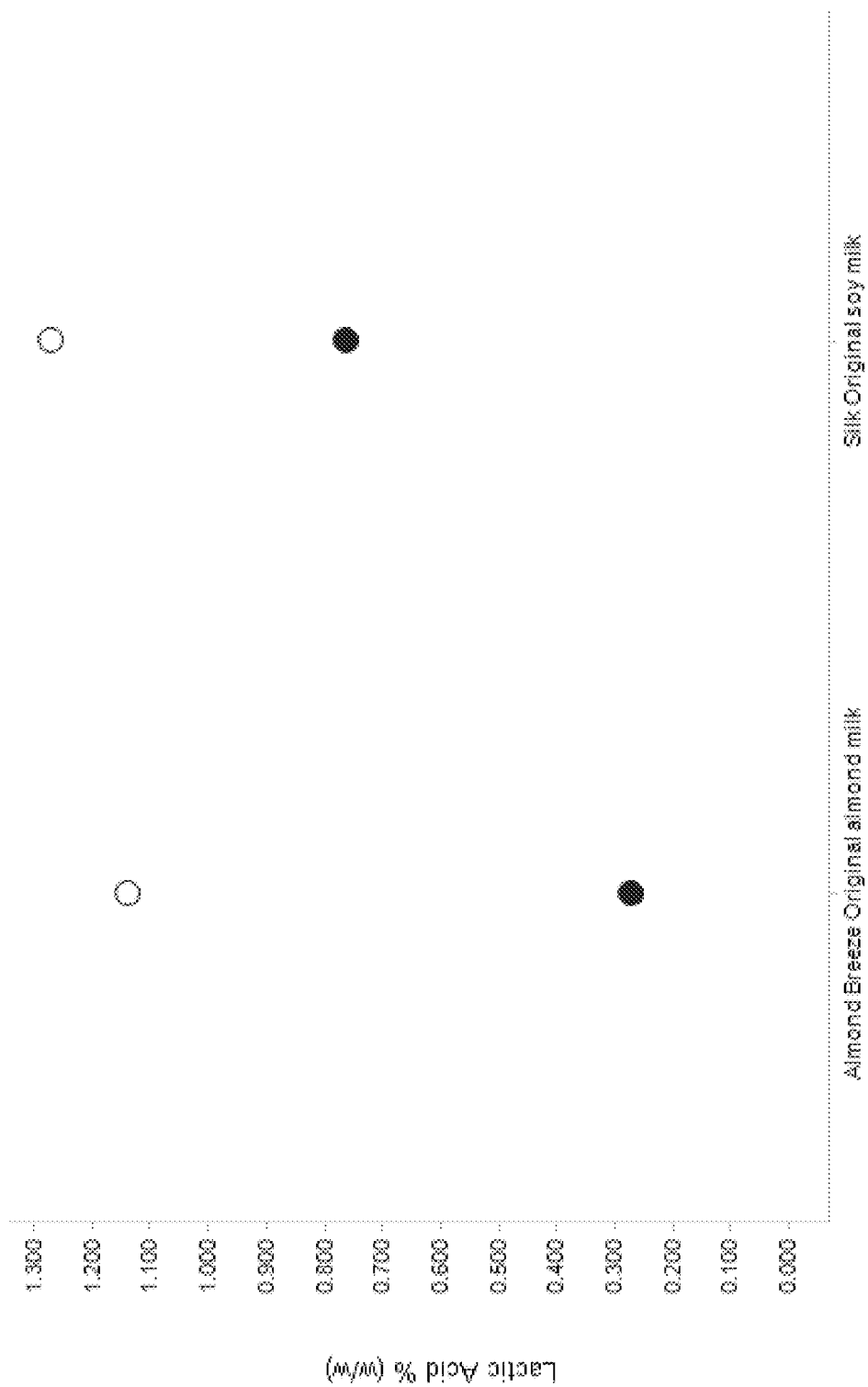
FIG. 7 shows the increase in lactic acid concentration upon supplementation of plant-based beverages, according to certain embodiments.

This example shows an increase in the production of lactic acid across a range of plant protein isolates by supplementing the fermentation. FIG. 6 shows the increase in lactic acid concentration by supplementing fat-free yogurt formulations that contain one of a variety of plant protein isolates including mushroom, pea, potato, rice, and soy. The change in lactic acid % (w/w) is calculated by subtracting the unsupplemented lactic acid amount from the supplemented lactic acid amount. Each symbol represents a unique protein isolate. Formulations are defined in Table 3.

TABLE 3

| Ingredient | Unsupplemented % is w/w | Supplemented % is w/w |
|---|---|---|
| Plant Protein Isolate (as % actual Protein) | 4% | 4% |
| Cane Sugar | 5% | 5% |
| Non-dairy starter culture | 0.02% | 0.02% |
| Yeast Extract | | 0.1% |
| Potassium phosphate | | 0.15% |

Example 4. Fat-free Yogurt Analog

In this example, a fat-free yogurt formulation was prepared that contained pea protein, honey, riboflavin, niacin, methionine, serine, threonine (Table 4). Fat-free diary yogurts deliver a product with protein (about 4-8% w/w actual protein) but without the negative health associations of fat. This example shows a plant-based fat-free yogurt analog that eliminates added fat while maintaining protein content (about 4% w/w actual protein). This formula was cultured using a typical fat-free yogurt procedure:

1) Mix protein in water for 5 minutes.
2) Add the honey to mixture.
3) Add vitamins and amino acids to mixture.
4) Heat to about 95° C. while mixing, hold for 2 minutes.
5) Cool to 40° C.
6) Add yogurt cultures and incubate at 40° C. for 15 hours.

This example demonstrates the ability to enable successful fermentation of fat-free yogurts and yogurt derivatives that contain gelled and fermented protein.

TABLE 4

| Ingredient | Example 4<br>% is w/w |
|---|---|
| Pea Protein Isolate<br>(as % actual Protein) | 4% |
| Honey | 6.5% |
| Non-dairy starter culture | 0.1% |
| Riboflavin | 1.5 ppm |
| Niacin | 20 ppm |
| Methionine | 100 ppm |
| Serine | 100 ppm |
| Threonine | 100 ppm |

Example 5. Large Scale Yogurt Analog

In this example, a yogurt formulation was prepared that contained pea protein, cane sugar, sunflower lecithin, sunflower oil, yeast extract, and sodium phosphate (Table 5). This formula was cultured using a typical large-scale yogurt procedure:

1) Batch ingredients using a liquefier and mix for about 30 minutes.
2) Homogenize mixture at about 2500 psi to reduce particle size.
3) Pasteurize mixture for about 7 minutes at about 90° C.
5) Cool to about 42° C.
6) Add yogurt cultures and incubate at about 42° C. for about 8 hours.

This example demonstrates the scalability of the technology and use of standard dairy yogurt manufacturing techniques.

TABLE 5

| Ingredient | Example 5<br>% w/w |
|---|---|
| Pea Protein Isolate<br>(as % actual Protein) | 4% |
| Cane Sugar | 4% |
| Sunflower oil | 3% |
| Sunflower lecithin | 0.1% |
| Non-dairy starter culture | 0.1% |
| Yeast Extract | 0.5% |
| Potassium phosphate | 0.4% |

Example 6. Drinkable Style Yogurt Analog

In this example, a drinkable style yogurt formulation was prepared that contained soy protein, glucose, soy lecithin, soybean oil, soy protein hydrolysate, and sodium citrate (Table 6). Drinkable dairy yogurts may have less protein (about 2 to 3% w/w actual protein) and added water compared to standard yogurts. In order to create a plant-based version of a drinkable yogurt the protein content of the yogurt mixture was adjusted, yielding a product with lower viscosity and greater pourability. This formula was cultured using the procedure described in Example 5.

This example demonstrates that the technology disclosed herein enables fermentation of lower protein (about 2% w/w actual protein) containing yogurts and yogurt derivatives that contain gelled and fermented protein.

TABLE 6

| Ingredient | Example 6<br>% w/w |
|---|---|
| Soy Protein Isolate<br>(as % actual Protein) | 2% |
| Glucose | 6% |
| Soybean oil | 2% |
| Soy lecithin | 0.05% |
| Non-dairy starter culture | 0.1% |
| Soy Protein Hydrolysate | 0.1% |
| Sodium Citrate | 0.2% |

Example 7. Greek Style Yogurt Analog

In this example, a Greek style yogurt formulation was prepared that contained pea protein, invert sugar, sunflower lecithin, sunflower oil, coconut oil, sodium citrate, and sodium phosphate (Table 7). Greek Style dairy yogurts are typically thicker than standard yogurt and often contain more protein (about 8% w/w). This example shows a plant-based Greek style yogurt analog that matches the thickness and protein content of Greek style dairy yogurts. This formula was cultured using procedure described in Example 5.

This example demonstrates fermentation of high protein (about 8% w/w actual protein) containing yogurts and yogurt derivatives that contain gelled and fermented protein.

TABLE 7

| Ingredient | Example 7<br>% w/w |
|---|---|
| Pea Protein Isolate<br>(as % actual Protein) | 8% |
| Invert Sugar | 5% |
| Sunflower oil | 3% |
| Coconut oil | 2% |
| Sunflower lecithin | 0.1% |
| Non-dairy starter culture | 0.1% |
| Sodium citrate | 0.2% |
| Sodium phosphate | 0.1% |

Example 8. Fermentation of Plant-Based Beverages

In this example soy and almond plant-based beverages were fermented into yogurts or yogurt type analogs. FIG. 6 shows the increase in lactic acid concentration with supplementation. Silk Original soy milk or Almond Breeze original almond milk were inoculated with non-dairy starter culture (0.02%) and incubated at 40° C. The formulas were either unsupplemented (closed circles) or supplemented with 0.2% yeast extract and 0.4% potassium phosphate (open circles). The supplemented fermentations were able to produce higher amounts of lactic acid compared to the unsupplemented fermentations.

These examples define a range of conditions that allow for suitable fermentation from yogurt formulations containing plant-based protein isolates. Table 8 provides exemplary ranges of some of the ingredients.

TABLE 8

| Ingredient | Range |
|---|---|
| Plant Protein Isolate<br>(as % actual Protein) | 1-10% |

TABLE 8-continued

| Ingredient | Range |
| --- | --- |
| Fermentable Carbohydrate | 1-10% |
| Oil/Fatty Material | 0-6% |
| Emulsifier | 0-0.5% |
| Complex amino acid mixture | 0-1% |
| Vitamins | 0-30 ppm |
| Amino Acids | 0-200 ppm |
| Buffer agents | 0-1% |

Further advantages of the claimed subject matter will become apparent from the following examples describing certain embodiments of the claimed subject matter.

Example 1A. A Method for Producing a Plant-Based Yogurt Formulation capable of being used to make a plant-based yogurt analog comprising the steps of:
 a) obtaining an essentially dairy-free base for a yogurt formulation that includes a plant-based derivative; and
 b) adding one or more acids to said formulation.

2A. The method of example 1A, wherein the one or more acids are selected from the group of amino acids.

3A. The method of one or more of examples 1A or 2A, wherein the one or more acids are selected from the group of l-methionine, l-serine, l-threonine, or combinations thereof.

4A. The method of one or more of examples 2A or 3A, wherein the amount of the amino acids added is between about 0.03 and 0.1% by weight of the plant-based derivative.

5A. A method of producing a non-dairy yogurt formulation comprising the steps of:
 a) blending a protein-containing edible portion of one or more plants to form a mixture;
 b) adding oil to the mixture;
 c) adding sugar to the mixture; and
 d) adding an additive selected from the group of: lecithin; amino acids; potassium phosphate; niacin; riboflavin; yeast extract; yeast; or some combination thereof in a sufficient quantity such that the pH of the resulting mixture is below 4.5 or 5 once the mixture is cultured using a yogurt culturing procedure.

6A. The method of example 5A, wherein the yogurt culturing procedure comprises; (1) heating the mixture for a first pre-determined amount of time; (2) allowing the mixture to cool; (3) adding yogurt cultures to the mixture; and (4) incubating the mixture for a second pre-determined amount of time.

7A. The method of example 6A, wherein the mixture is heated at a temperature of greater than 150° F.

8A. The method of one or more of examples 6A or 7A, wherein the mixture is heated at a temperature of about 185° F.

9A. The method of one or more of examples 6A-8A, wherein the first pre-determined amount of time is greater than 10 seconds or greater than 20 seconds or greater than 30 seconds.

10A. The method of one or more of examples 6A-9A, wherein the first pre-determined amount of time is about 20 seconds or about 25 seconds or about 30 seconds or about 35 seconds.

11A. The method of one or more of examples 6A-10A, wherein the mixture is stirred while being heated.

12A. The method of one or more of examples 6A-11A, wherein the mixture is cooled below 130° F. or 120° F. or 110° F. or 100° F.

13A. The method of one or more of examples 6A-12A, wherein the mixture is cooled to about 125° F. or 120° F. or 115° F. or 110° F. or 105° F. or 100° F. or 95° F. or 90° F.

14A. The method of one or more of examples 6A-13A, wherein the second pre-determined amount of time is greater than 6 hours or greater than 12 hours or greater than 18 hours or greater than 24 hours.

15A. The method of one or more of examples 6A-14A, wherein the second pre-determined amount of time is about 12 hours or about 14 hours or about 16 hours or about 18 hours or about 20 hours or about 22 hours or about 24 hours.

16A. The method of one or more of examples 6A-15A, wherein the mixture is incubated at greater than 80° F. or greater than 90° F. or greater than 100° F. or greater than 105° F. or greater than 110° F. or greater than 115° F.

17A. The method of one or more of examples 6A-16A, wherein the mixture is incubated at about 95° F. or about 100° F. or about 105° F. or about 106° F. or about 107° F. or about 108° F. or about 109° F. or about 110° F. or about 115° F. or about 120° F.

18A. A method of producing a non-dairy yogurt formulation comprising the steps of:
 a) blending the protein-containing edible portion of one or more plants to form a mixture;
 b) adding oil to the mixture;
 c) adding sugar to the mixture; and
 d) adding an additive to the mixture selected from the group of: lecithin; amino acids; potassium phosphate; niacin; riboflavin; yeast extract; yeast; or some combination thereof in a sufficient quantity such that the pH of the resulting mixture is below 4.5 or 5 once the mixture is (1) heated at about 185° F. for 20 to 60 seconds while stirring; (2) the resultant mixture is covered and allowed to cool at about 105° F.; (3) yogurt cultures are added to the mixture; and (4) the resultant mixture is incubated at about 108° F. for about 24 hours.

19A. The method of one or more of examples 5A-18A, wherein the one or more plants are high-starch plants.

20A. The method of one or more of examples 5A-19A, wherein the one or more plants are peas.

21A. The method of one or more of examples 5A-20A, wherein the oil is sunflower oil.

22A. The method of one or more of examples 5A-21A, wherein the additive is lecithin.

23A. The method of one or more of examples 5A-21A, wherein the additive is selected from the group of l-methionine, l-serine, l-threonine, or combinations thereof.

24A. An essentially dairy-free formulation comprising:
 a) between 10-50% by weight of a plant-based derivative; and
 b) an additive selected from the group of: lecithin; amino acids; potassium phosphate; niacin; riboflavin; yeast extract; or yeast; or some combination thereof in a sufficient quantity such that the pH of the resulting mixture is below 4.5 or 5 once the mixture is cultured using a yogurt culturing procedure.

25A. The formulation of example 24A, wherein the yogurt culturing procedure comprises: (1) mixing the plant-based derivative and the additive to form a mixture; (2) heating the mixture for a first pre-determined amount of time; (3) allowing the mixture to cool; (4) adding yogurt cultures to the mixture; and (5) incubating the mixture for a second pre-determined amount of time.

26A. The formulation of example 25A, wherein the mixture is heated at a temperature of greater than 150° F.

27A. The formulation of one or more of examples 25A or 26A, wherein the mixture is heated at a temperature of about 185° F.

28A. The formulation of one or more of examples 25A-27A, wherein the first pre-determined amount of time is greater than 10 seconds or greater than 20 seconds or greater than 30 seconds.

29A. The formulation of one or more of examples 25A-28A, wherein the first pre-determined amount of time is about 20 seconds or about 25 seconds or about 30 seconds or about 35 seconds.

30A. The formulation of one or more of examples 25A-29A, wherein the mixture is stirred while being heated.

31A. The formulation of one or more of examples 25A-30A, wherein the mixture is cooled below 130° F. or 120° F. or 110° F. or 100° F.

32A. The formulation of one or more of examples 25A-31A, wherein the mixture is cooled to about 125° F. or 120° F. or 115° F. or 110° F. or 105° F. or 100° F. or 95° F. or 90° F.

33A. The formulation of one or more of examples 25A-32A, wherein the second pre-determined amount of time is greater than 6 hours or greater than 12 hours or greater than 18 hours or greater than 24 hours.

34A. The formulation of one or more of examples 25A-33A, wherein the second pre-determined amount of time is about 12 hours or about 14 hours or about 16 hours or about 18 hours or about 20 hours or about 22 hours or about 24 hours.

35A. The formulation of one or more of examples 25A-34A, wherein the mixture is incubated at greater than 80° F. or greater than 90° F. or greater than 100° F. or greater than 105° F. or greater than 110° F. or greater than 115° F.

36A. The formulation of one or more of examples 25A-35A, wherein the mixture is incubated at about 95° F. or about 100° F. or about 105° F. or about 106° F. or about 107° F. or about 108° F. or about 109° F. or about 110° F. or about 115° F. or about 120° F.

37A. An essentially dairy-free formulation comprising:
  a) between 10-50% by weight of a plant-based derivative; and
  b) an additive selected from the group of: lecithin; amino acids; potassium phosphate; niacin; riboflavin; yeast extract; or yeast; or some combination thereof in a sufficient quantity such that if the formulation was (1) mixed; (2) heated at about 185° F. for between 20 to 60 seconds while stirring; (3) the resultant mixture were then covered and allowed to cool at about 105° F.; (4) yogurt cultures were added to the mixture; and (5) the resultant mixture were incubated at about 108° F. for about 24 hours, then the pH of the resultant mixture would be below 4.5 or 5.

38A. The formulation of one or more of examples 25A-37A, further comprising at least about 4% sugar.

39A. The formulation of one or more of examples 25A-38A, wherein the additive comprises one or more amino acids.

40A. The formulation of one or more of examples 25A-39A, wherein the additive comprises at least one of l-methionine, l-serine, or l-threonine.

41A. The formulation of one or more of examples 25A-40A, wherein the weight of the amino acid added is at least about 0.02% of the weight of the plant-based derivative.

42A. The formulation of one or more of examples 25A-38A, wherein the additive comprises potassium phosphate.

43A. The formulation of one of more of examples 25A-41A, further comprising potassium phosphate.

44A. The formulation of one or more of examples 25A-38A, wherein the additive comprises niacin.

45A. The formulation of one of more of examples 25A-43A, further comprising niacin.

46A. A formulation comprising, by weight:
  a) between 25% to 35% pea protein paste,
  b) between 3% to 8% cane sugar,
  c) between 0.5 to 8% sunflower oil,
  d) between 0.05% to 0.3% sunflower lecithin,
  e) between 0.0% to 0.001% riboflavin,
  f) between 0.0% to 0.001%% niacin,
  g) between 0.1% to 1% potassium phosphate monobasic;
  h) between 0.0% to 0.03% of a combination of l-methionine, l-serine, and l-threonine, and
  i) between 0.1% to 3% yogurt cultures.

47A. A formulation comprising, by weight:
  a) between 28% to 32% pea protein paste,
  b) between 5% to 7% cane sugar,
  c) between 0.5 to 2% sunflower oil,
  d) between 0.1% to 0.3% sunflower lecithin,
  e) between 0.0% to 0.001% riboflavin,
  f) between 0.0% to 0.001% niacin,
  g) between 0.1% to 1% potassium phosphate monobasic;
  h) between 0.0% to 0.03% of a combination of l-methionine, l-serine, and l-threonine, and
  i) between 0.3% to 1.5% yogurt cultures.

48A. The formulation of one of more of examples 24A-47A, wherein the formulation is dairy free.

49A. The method of one or more of examples 1A-23A, wherein the formulation is essentially dairy-free.

50A. The method of one or more of examples 1A-23A, wherein the formulation is dairy-free.

51A. A plant-based yogurt analog comprising:
  a) at least one of between 1% to 10% by weight of a plant protein, and between 1% to 90% by weight of a plant protein isolate.

52A. The plant-based yogurt analog of example 51A, wherein the plant protein isolate comprises at least about 5%, 10%, 20%, 30%, 40%, 50%, 60%, 70%, 80%, or 90% by weight of protein.

53A. The plant-based yogurt analog of example 52A, wherein the plant protein isolate is a fermented plant protein isolate.

54A. The plant-based yogurt analog of example 52A, wherein the plant protein isolate is a substantially fermented plant protein isolate.

55A. The plant-based yogurt analog of example 52A, wherein a portion of the plant protein isolate is a fermented plant protein isolate.

56A. The plant-based yogurt analog of example 52A, wherein at least 60%, 70%, 80%, 90%, or 95% by weight of the plant protein isolate is fermented.

57A. The plant-based yogurt analog of example 52, wherein the plant protein isolate is a gelled plant protein isolate.

58A. The plant-based yogurt analog of example 52A, wherein the plant protein isolate is a substantially gelled plant protein isolate.

59A. The plant-based yogurt analog of example 52A, wherein a portion of the plant protein isolate is a gelled plant protein isolate.

60A. The plant-based yogurt analog of example 52A, wherein at least 60%, 70%, 80%, 90%, or 95% by weight of the plant protein isolate is gelled.

61A. The plant-based yogurt analog of example 52A, wherein the plant protein isolate is a fermented plant protein isolate.

62A. The plant-based yogurt analog of example 52A, wherein the plant protein isolate is a substantially fermented plant protein isolate.

63A. The plant-based yogurt analog of example 52A, wherein a portion of the plant protein isolate is a fermented plant protein isolate.

64A. The plant-based yogurt analog of example 52A, wherein at least 60%, 70%, 80%, 90%, or 95% by weight of the plant protein isolate is fermented.

65A. The plant-based yogurt analog of example 52A, wherein the plant protein isolate is a fermented and gelled plant protein isolate.

66A. The plant-based yogurt analog of example 52A, wherein the plant protein isolate is a substantially fermented and substantially gelled plant protein isolate.

67A. The plant-based yogurt analog of one or more of examples 51A to 66A, wherein the percentage of protein in the plant-based yogurt analog is between 1% and 10% by weight and the percentage of lactic acid in the plant-based yogurt is at least between 0.25% and 1.15% by weight.

68A. The plant-based yogurt analog of one or more of examples 51A to 66A, wherein the percentage of protein in the plant-based yogurt analog is at or below 1% by weight and the percentage of lactic acid in the plant-based yogurt is greater than or equal to 0.25% by weight.

69A. The plant-based yogurt analog of one or more of examples 51A to 66A, wherein the percentage of protein in the plant-based yogurt analog is between 1.4% and 1.6% by weight and the percentage of lactic acid in the plant-based yogurt is greater than or equal to 0.3% by weight.

70A. The plant-based yogurt analog of one or more of examples 51A to 66A, wherein the percentage of protein in the plant-based yogurt analog is between 1.9% and 2.1% by weight and the percentage of lactic acid in the plant-based yogurt is greater than or equal to 0.35% by weight.

71A. The plant-based yogurt analog of one or more of examples 51A to 66A, wherein the percentage of protein in the plant-based yogurt analog is between 2.4% and 2.6% by weight and the percentage of lactic acid in the plant-based yogurt is greater than or equal to 0.4% by weight.

72A. The plant-based yogurt analog of one or more of examples 51A to 66A, wherein the percentage of protein in the plant-based yogurt analog is between 2.9% and 3.1% by weight and the percentage of lactic acid in the plant-based yogurt is greater than or equal to 0.45% by weight.

73A. The plant-based yogurt analog of one or more of examples 51A to 66A, wherein the percentage of protein in the plant-based yogurt analog is between 3.4% and 3.6% by weight and the percentage of lactic acid in the plant-based yogurt is greater than or equal to 0.5% by weight.

74A. The plant-based yogurt analog of one or more of examples 51A to 66A, wherein the percentage of protein in the plant-based yogurt analog is between 3.9% and 4.1% by weight and the percentage of lactic acid in the plant-based yogurt is greater than or equal to 0.55% by weight.

75A. The plant-based yogurt analog of one or more of examples 51A to 66A, wherein the percentage of protein in the plant-based yogurt analog is between 4.4% and 4.6% by weight and the percentage of lactic acid in the plant-based yogurt is greater than or equal to 0.6% by weight.

76A. The plant-based yogurt analog of one or more of examples 51A to 66A, wherein the percentage of protein in the plant-based yogurt analog is between 4.9% and 5.1% by weight and the percentage of lactic acid in the plant-based yogurt is greater than or equal to 0.65% by weight.

77A. The plant-based yogurt analog of one or more of examples 51A to 66A, wherein the percentage of protein in the plant-based yogurt analog is between 5.4% and 5.6% by weight and the percentage of lactic acid in the plant-based yogurt is greater than or equal to 0.7% by weight.

78A. The plant-based yogurt analog of one or more of examples 51A to 66A, wherein the percentage of protein in the plant-based yogurt analog is between 5.9% and 6.1% by weight and the percentage of lactic acid in the plant-based yogurt is greater than or equal to 0.75% by weight.

79A. The plant-based yogurt analog of one or more of examples 51A to 66A, wherein the percentage of protein in the plant-based yogurt analog is between 6.4% and 6.6% by weight and the percentage of lactic acid in the plant-based yogurt is greater than or equal to 0.8% by weight.

80A. The plant-based yogurt analog of one or more of examples 51A to 66A, wherein the percentage of protein in the plant-based yogurt analog is between 6.9% and 7.1% by weight and the percentage of lactic acid in the plant-based yogurt is greater than or equal to 0.85% by weight.

81A. The plant-based yogurt analog of one or more of examples 51A to 66A, wherein the percentage of protein in the plant-based yogurt analog is between 7.4% and 7.6% by weight and the percentage of lactic acid in the plant-based yogurt is greater than or equal to 0.9% by weight.

82A. The plant-based yogurt analog of one or more of examples 51A to 66A, wherein the percentage of protein in the plant-based yogurt analog is between 7.9% and 8.1% by weight and the percentage of lactic acid in the plant-based yogurt is greater than or equal to 0.95% by weight.

83A. The plant-based yogurt analog of one or more of examples 51A to 66A, wherein the percentage of protein in the plant-based yogurt analog is between 8.4% and 8.6% by weight and the percentage of lactic acid in the plant-based yogurt is greater than or equal to 1.0% by weight.

84A. The plant-based yogurt analog of one or more of examples 51A to 66A, wherein the percentage of protein in the plant-based yogurt analog is between 8.9% and 9.1% by weight and the percentage of lactic acid in the plant-based yogurt is greater than or equal to 1.05% by weight.

85A. The plant-based yogurt analog of one or more of examples 51A to 66A, wherein the percentage of protein in the plant-based yogurt analog is between 9.4% and 9.6% by weight and the percentage of lactic acid in the plant-based yogurt is greater than or equal to 1.1% by weight.

86A. The plant-based yogurt analog of one or more of examples 51A to 66A, wherein the percentage of protein in the plant-based yogurt analog is between 9.9% and 10.1% by weight and the percentage of lactic acid in the plant-based yogurt is greater than or equal to 1.15% by weight.

87A. A plant-based yogurt analog comprising:
a) a plant protein,
b) a carbohydrate,
c) an oil and/or fat,
d) an emulsifier, and
e) a buffer agent.

88A. The plant-based yogurt analog of example 87A, wherein the plant protein is a plant protein isolate.

89A. The plant-based yogurt analog of example 88A, wherein the plant protein isolate is a fermented plant protein isolate.

90A. The plant-based yogurt analog of example 88A, wherein the plant protein isolate is a substantially fermented plant protein isolate.

91A. The plant-based yogurt analog of example 88A, wherein a portion of the plant protein isolate is a fermented plant protein isolate.

92A. The plant-based yogurt analog of example 88A, wherein at least 60%, 70%, 80%, 90%, or 95% by weight of the plant protein isolate is fermented.

93A. The plant-based yogurt analog of example 88A, wherein the plant protein isolate is a gelled plant protein isolate.

94A. The plant-based yogurt analog of example 88A, wherein the plant protein isolate is a substantially gelled plant protein isolate.

95A. The plant-based yogurt analog of example 88A, wherein a portion of the plant protein isolate is a gelled plant protein isolate.

96A. The plant-based yogurt analog of example 88A, wherein at least 60%, 70%, 80%, 90%, or 95% by weight of the plant protein isolate is gelled.

97A. The plant-based yogurt analog of example 88A, wherein the plant protein isolate is a fermented plant protein isolate.

98A. The plant-based yogurt analog of example 88A, wherein the plant protein isolate is a substantially fermented plant protein isolate.

99A. The plant-based yogurt analog of example 88A, wherein a portion of the plant protein isolate is a fermented plant protein isolate.

100A. The plant-based yogurt analog of example 88A, wherein at least 60%, 70%, 80%, 90%, or 95% by weight of the plant protein isolate is fermented.

101A. The plant-based yogurt analog of example 88A, wherein the plant protein isolate is a fermented and gelled plant protein isolate.

102A. The plant-based yogurt analog of example 88A, wherein the plant protein isolate is a substantially fermented and substantially gelled plant protein isolate.

103A. The plant-based yogurt analog of one or more of examples 87A to 102A, wherein the percentage of protein in the plant-based yogurt analog is between 1.9% and 2.1% by weight and the percentage of lactic acid in the plant-based yogurt is greater than or equal to 0.35% by weight.

104A. The plant-based yogurt analog of one or more of examples 87A to 102A, wherein the percentage of protein in the plant-based yogurt analog is between 3.9% and 4.1% by weight and the percentage of lactic acid in the plant-based yogurt is greater than or equal to 0.55% by weight.

105A. The plant-based yogurt analog of one or more of examples 87A to 102A, wherein the percentage of protein in the plant-based yogurt analog is between 5.9% and 6.1% by weight and the percentage of lactic acid in the plant-based yogurt is greater than or equal to 0.75% by weight.

106A. The plant-based yogurt analog of one or more of examples 87A to 102A, wherein the percentage of protein in the plant-based yogurt analog is between 7.9% and 8.1% by weight and the percentage of lactic acid in the plant-based yogurt is greater than or equal to 0.95% by weight.

107A. The plant-based yogurt analog of one or more of examples 51A to 86A, wherein the plant-based yogurt analog further comprises between 0.0% to 1% by weight of a complex amino acid mixture.

108A The plant-based yogurt analog of one or more of examples 51A to 86A, wherein the plant-based yogurt analog further comprises one or more of the following niacin, riboflavin, yeast extract, l-methionine, l-serine, l-threonine.

109A. The plant-based yogurt analog of one or more of examples 51A to 86A, wherein the plant-based yogurt analog further comprises one or more yogurt cultures.

110A. The plant-based yogurt analog of one or more of examples 51A to 86A, wherein the plant-based yogurt analog further comprises between 0.1% to 1% by weight of a buffer agent.

111A. The plant-based yogurt analog of one or more of examples 51A to 86A, wherein the plant-based yogurt analog further comprises one or more yogurt cultures.

112A. The plant-based yogurt analog of one or more of examples 51A to 86A, wherein the plant-based yogurt analog is a cultured plant-based yogurt analog.

113A. The plant-based yogurt analog of one or more of examples 87A to 106A, wherein the plant-based yogurt analog further comprises between 0.0% to 1% by weight of a complex amino acid mixture.

108A The plant-based yogurt analog of one or more of examples 87A to 106A, wherein the plant-based yogurt analog further comprises one or more of the following niacin, riboflavin, yeast extract, l-methionine, l-serine, l-threonine.

109A. The plant-based yogurt analog of one or more of examples 87A to 106A, wherein the plant-based yogurt analog further comprises one or more yogurt cultures.

110A. The plant-based yogurt analog of one or more of examples 87A to 106A, wherein the plant-based yogurt analog further comprises between 0.1% to 1% by weight of a buffer agent.

111A. The plant-based yogurt analog of one or more of examples 87A to 106A, wherein the plant-based yogurt analog further comprises one or more yogurt cultures.

112A. The plant-based yogurt analog of one or more of examples 87A to 106A, wherein the plant-based yogurt analog is a cultured plant-based yogurt analog.

The disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents that fall within the range of the claims are intended to be embraced therein.

That which is claimed:

1. A cultured dairy-free plant-based yogurt analog comprising between about 1% and about 10% by weight of a pea protein and wherein the percentage of lactic acid in the plant-based yogurt analog is between about 0.25% and about 1.15% by weight.

2. The dairy-free plant-based yogurt analog of claim 1, wherein the percentage of protein in the plant-based yogurt analog is between about 1.9% and about 2.1% by weight and the percentage of lactic acid in the plant-based yogurt is greater than or equal to about 0.35% by weight.

3. The dairy-free plant-based yogurt analog of claim 1, wherein the percentage of protein in the plant-based yogurt analog is between about 3.9% and about 4.1% by weight and the percentage of lactic acid in the plant-based yogurt is greater than or equal to about 0.55% by weight.

4. The dairy-free plant-based yogurt analog of claim 1, wherein the percentage of protein in the plant-based yogurt analog is between about 5.9% and about 6.1% by weight and the percentage of lactic acid in the plant-based yogurt is greater than or equal to about 0.75% by weight.

5. The dairy-free plant-based yogurt analog of claim 1, wherein the percentage of protein in the plant-based yogurt analog is between about 7.9% and about 8.1% by weight and the percentage of lactic acid in the plant-based yogurt is greater than or equal to about 0.95% by weight.

6. The dairy-free plant-based yogurt analog of claim 1, wherein the plant-based yogurt analog further comprises between about 1% and about 10% of a carbohydrate.

7. The dairy-free plant-based yogurt analog of claim 1, wherein the plant-based yogurt analog further comprises between about 0.5 to about 8% by weight of an oil.

8. The dairy-free plant-based yogurt analog of claim 1, wherein the plant-based yogurt analog further comprises between about 0.05% to about 0.3% by weight of an emulsifier.

9. The dairy-free plant-based yogurt analog of claim 1, wherein the plant-based yogurt analog further comprises between 0.0% and about 1% by weight of a complex amino acid mixture.

10. The dairy-free plant-based yogurt analog of claim 1, wherein the plant-based yogurt analog further comprises one or more of the following niacin, riboflavin, yeast extract, L-methionine, l-serine, l-threonine.

11. The dairy-free plant-based yogurt analog of claim 1, wherein the plant-based yogurt analog further comprises between 0.1% and about 1% by weight of a buffer agent.

12. The dairy-free plant-based yogurt analog of claim 1, wherein the cultured plant-based yogurt analog comprises a yogurt culture comprising at least one bacterium selected from the group consisting of *Lactobacillus* spp, *Streptococcus* spp, and both *Lactobacillus* spp and *Streptococcus* spp.

13. A dairy-free plant-based yogurt analog comprising between 1% to 10% by weight of a pea protein and 0.1% to 10% by weight of protein from an additional non-animal source, wherein the percentage of lactic acid in the plant-based yogurt analog is between about 0.25% and about 1.15% by weight.

14. The dairy-free plant-based yogurt analog of claim 13, wherein said additional non-animal source is selected from the group consisting of melon, barley, coconut, pear, emmer, carrot, lupin, fennel, lettuce, oat, cabbage, celery, flax, mushroom, rice, almond, corn, sunflower, soybean and combinations thereof.

* * * * *